United States Patent [19]

Liepa

[11] Patent Number: 4,520,439
[45] Date of Patent: May 28, 1985

[54] VARIABLE FIELD PARTIAL WRITE DATA MERGE

[75] Inventor: Arnolds E. Liepa, St. Paul, Minn.

[73] Assignee: Sperry Corporation, New York, N.Y.

[21] Appl. No.: 222,340

[22] Filed: Jan. 5, 1981

[51] Int. Cl.³ ............................ G06F 9/00; G06F 9/12
[52] U.S. Cl. ...................................................... 364/200
[58] Field of Search ... 364/200 MS File, 900 MS File

[56] References Cited

U.S. PATENT DOCUMENTS

| | | | |
|---|---|---|---|
| 3,781,812 | 12/1973 | Wymore et al. | 364/200 |
| 4,103,329 | 7/1978 | Davis et al. | 364/200 |
| 4,109,310 | 8/1978 | England et al. | 364/200 |

Primary Examiner—Gareth D. Shaw
Assistant Examiner—John G. Mills
Attorney, Agent, or Firm—Charles A. Johnson; Kenneth T. Grace; Marshall M. Truex

[57] ABSTRACT

A variable field partial write system for merging data bits in a memory word or words upon programmable request is described. The variable bit field can be selected for any number of bit positions from a single bit up to and including a full data word, where data words are comprised of a predetermined number of bytes each containing a predetermined number of bits. A starting bit code defines the location of the start of the bit field to be written and a field length code defines the number of bits that are to be merged and written. The combination of the starting bit code and the field length code define the ending bit control for the bits to be written, and are further utilized to control word boundary crossing into the next sequentially addressed memory word when the bit field to be written cannot be completed in the addressed word. Mask signals are generated for all bit positions that precede the starting bit code and that follow the ending bit code so that bit positions of data words read from memory that correspond to the mask bits are merged unaltered with the variable field bits that are to be written and the merged data words are thereafter returned for storage in the memory system. Bit mask signals are generated for all like-ordered bits in each byte and byte mask signals are generated to enable setting of mask configurations for all bytes in which at least one bit is to remain unaltered, through the use of decode and translator circuits coupled to control bit mask circuits and byte mask circuits.

23 Claims, 34 Drawing Figures

VARIABLE FIELD
PARTIAL WRITE —
WORD BOUNDARY NOT CROSSED

VARIABLE FIELD PARTIAL WRITE-WORD BOUNDARY CROSSED

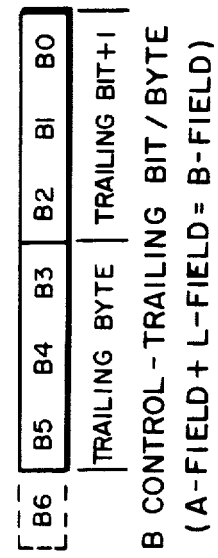
Fig. 7
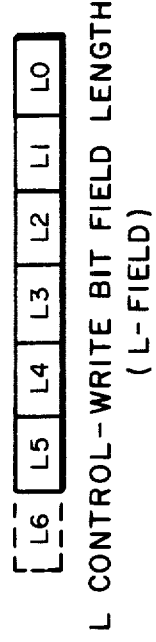
Fig. 4
Fig. 6
Fig. 5

LOW AND

LOW OR

HIGH OR

INVERTER

EXCLUSIVE OR

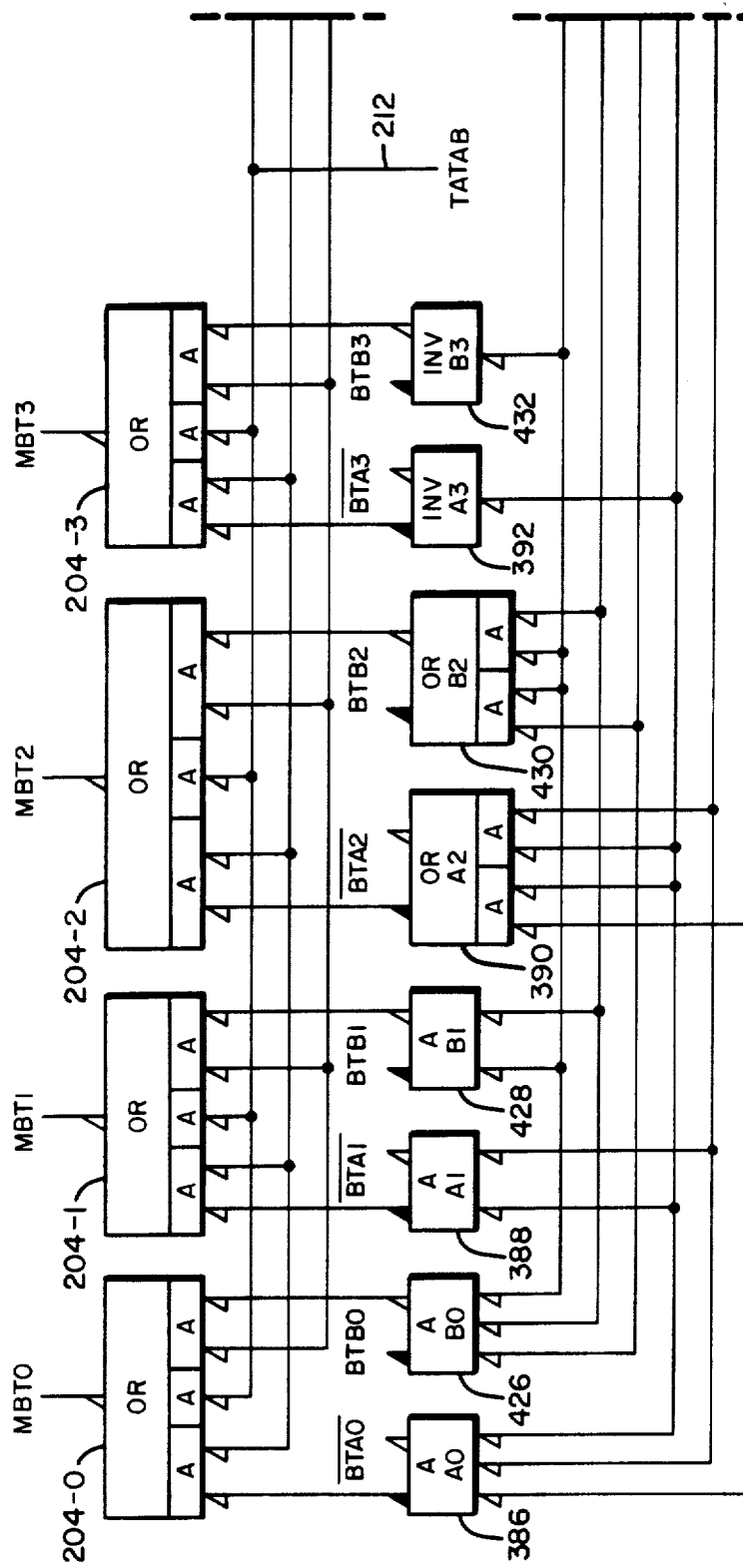

VARIABLE FIELD PARTIAL WRITE DATA MERGE

BACKGROUND OF THE INVENTION

In the data processing arts, it has been a consistent goal to achieve faster and faster computing rates. Coupled with this goal of faster computing rates is a parallel goal of providing system architecture that provides for a general purpose computing operation. In the past, it has been common for the data processing system to have system architecture designed for a fixed data word length. Often, the data word length is selected to be compatible with the data word storage register capacity in the main memory system. For example, if a 36-bit memory registers are employed, it was often common that the data processing systems would function on a 36-bit basis. At a relatively early time in the development of binary computing systems, it was recognized that a more efficient utilization of the main memory could be accomplished by providing for half-word access to the main memory system for reading and writing operations. Such systems usually operated on a whole-word basis in arithmetic operations, even though access could be made to the memory on a half-word basis.

As system architecture and memory systems were further improved and refined, systems were developed that permitted access for reading and writing in the main memory selectively on the basis of quarter-words, third-words as well as half-words on a fixed bit-arrangement basis. Since the binary data processing systems were normally arranged with the memory register capacity being fixed at some multiple of two or some power of two, these fractional arrangements were relatively easy to define and implement. With the development of the fractional-word reading and writing capability in memory systems, there was developed various types of data processing architectures that permitted the arithmetic manipulation of fractional data words.

In the types of data processing systems mentioned thus far, no provision was made for providing the capability of writing variable length bit-fields, where the bit-field length could vary anywhere from a single bit in any memory word position, to the extent of writing a full memory word. Further, the systems were limited to fractional recording within the confines of a single addressed memory register, and word boundary crossing was not possible.

As the binary data processing systems were developed by various manufacturers, each manufacturer established individually designed system architectures, including establishment of various standards for memory register word capacity. For example, one manufacturer would have developed a product line where a 24-bit memory register word capacity was essentially a standard for its equipment, while another manufacturer would have developed a line of equipment where a 36-bit memory register was a standard for its equipment. The various systems that were of a general purpose variety would include instruction repertoires that differed in their specific functions, from system to system, but collectively often-times could be programmed to accomplish the same functions as other systems. As equipment costs became ever-more expensive, it became desireable from a customer view point that there be some form of compatibility between systems provided by different manufacturers. One important element in providing data processing systems that can accomplish performance of functions that are system compatible with other data processing systems, without limiting the memory register capacity to a fixed memory word capacity, is to provide a memory accessing system that allows for writing variable data bit-fields that can be utilized to emulate the memory register word capacity of other data processing systems. If the data processing system is to be utilized to emulate a system having a data word capacity less than the emulating system, and the writing of a variable bit-field is limited to a single word in the memory, there would result an inefficiency of utilization of the memory since it is likely that the unused bit positions could be effectively utilized.

As data processing systems became more complex, and the word capacity was increased, the fractional-word writing resulted in inefficiencies of utilization of memory, and failed to provide adequate versatility for many data processing operations where it was desireable to manipulate variable-length bit arrangements.

Many logical and data manipulative operations require the ability to read and write various variable length bit-fields. Such operations are often accomplished by logical instructions coupled with shifting of data words to accomplish the insertion of variable bit-fields in data words to be recorded. The sequences of logical operations coupled with shifting are time consuming and in many systems require additional shifting circuitry.

SUMMARY OF THE INVENTIONS

With the foregoing background of the invention in mind, and in accordance with the present invention, an improvement in digital data processing systems for providing variable field partial write merging of data bits in a memory word or words upon programmable requests is described. The present invention is considered to be a significant improvement in partial data word writing in that a variable length bit-field can be programmably selected for writing at a predetermined location within a data word stored in a main memory register. The system provides for response to a variable bit-field selection up to a full data word capacity, and provides further for response to control signals identifying the location at which the variable bit-field is to be written. In accordance with the invention, the variable bit-field can be selected for any number of bit positions ranging in number from a single bit partial write, continuously up through and including a full data word. A data word is considered to be a bit-grouping that has a number of bit positions that is equal to the number of bit positions in addressable memory locations in the main memory. A data word may be considered to be an instruction word for the data processing system, or an operand.

When a variable field partial data word write operation is selected, the word address for the partial write is accessed in the memory system, and the addressed word plus the next consecutive addressed word is made available to the variable bit-field writing circuitry. The two data words thus accessed from the memory system will be read out of the memory system and will be designated as the even address word and the odd address word. If the variable field partial write operation was limited to a single data word in the memory system, it is likely that the result would be an inefficiency in the utilization of the main memory system. By providing two addressed memory words simultaneously, the variable bit-field partial write system can accomplish a word boundary crossing in such a manner that a portion of the variable field appears in the addressed word and second portion of the variable field occurs in the next consecutive addressed word. As the variable field partial write bits are merged or inserted in the words that are accessed in the memory system, all bit positions that are not included in the variable length bit-field are masked and are returned to the memory system unaltered. It can be seen, then, that the variable bit-field is merged with existing data bits external to the memory systems, and that the system operation is transparent to the memory system and does not require alteration or selection in the addressing or writing circuitry of the memory system.

For purposes of discussion of this invention, the writing operation that involves the writing of a data word completely in an addressed memory register, will be referred to as a full word write. For such an operation, the addressed word is completely written and stored in the memory system. Any variable field partial data word write that is specified that would result in any bit positions of the addressed word being unaltered or masked, will be determined to be a partial word write even if the variable bit-field specified is of a capacity that would be equal to the bit capacity of a memory register.

During a partial write operation, the write data, which is comprised of up to a full data word of contiguous bits, to be written is received from a requestor unit, together with a specification of the address in the memory system at which the partial write data is to be merged. The requestor also provides a field length code which defines the number of contiguous bit that are to be merged with existing data bits during the partial write operation. The requestor also provides a bit offset code that specifies the starting bit position of the data bits that are to be written. The bit off-set code specified the bit position number with reference to some position of the data word, for example, the number of bit positions in decreasing order of significance starting from the most significant bit position. The bit off-set code is referred to hereinafter as the A-Field, and the field length is referred to as the L-Field.

The system operates during the partial write function to generate mask bits for the bit positions from the reference bit position of the data word addressed and continuing throughout the contiguous bit positions to, but not including the starting bit. The mask bits function to maintain the masked bit positions of the data word read from the memory systems in their existing state to be re-written in the memory system as the partial write operation is completed. The contiguous bit positions specified by the L-Field are written in the memory system as the partial write function is completed. The combination of the A-Field and the L-Field by addition provides a trailing bit control code that specifies where the variable field to be written is terminated, and specifies where the balance of the bit positions, if any, of the word addressed or of the next consecutive word is to commence having the bit positions masked. This trailing bit field will be referred to hereinafter as the B-Field. During a partial write operation, the A-Field and the L-Field are utilized to determine whether the contiguous bits that are to be written will cross the word boundary whereby some of the bits will be written in the addresed word and the balance of the bits will be written in the next sequential word.

When the requestor specifies a full word write function, no data bit merging or masking takes place, and the requestor specifies that the A-Field and the L-Field are each zero.

The data word is divided into bytes, with each byte comprising eight contiguous bit positions, it being understood that the last byte in a word may have less than eight bits. During a partial write operation, the variable field data merge mask system of this invention generates two types of control signals, these types being a bit mask and a byte mask. The bit mask generation is dependent upon the A-Field for generation of the bit mask to the starting bit, and is dependent upon the B-Field to determine the bit mask for the balance of the bits in the byte that contains the trailing bit. The byte mask is responsive to the A-Field for generating masking of the bytes that precede the Starting Bit, and is responsive to the B-Field to generate the mask control for the bytes that follow the byte containing the Trailing Bit. The bit mask and the byte mask signals are generated by decoder-translator circuitry that will be described in more detail below with reference to a specific embodiment. These decoder-translator circuits of the invention eliminate the need for counters and shift registers thereby providing faster operating rates. Further, the decoder-translator circuits involved require fewer circuits than would be required for an implementation of a variable field partial write data merge mask utilizing counters and shift registers, thereby resulting in more reliable operation due to reduced failure rates and reduced cost of construction.

OBJECTS

In view of the foregoing Background of the Invention and the Summary of the Invention, it is therefore an object of this invention to provide an improved system in digital data processing systems for providing variable field partial write merging of data bits in a memory word or words upon programmable request.

It is a further object of this invention to provide an improved system for selectively determining a bit field for writing within one or more data words while retaining unselected bit positions unaltered in the memory system.

Still another object of this invention is to provide an improved variable field partial write merging of data bits whose bit positions are defined by a starting bit position within an addressed memory word together with the field length to be written, all other bit positions being masked and unaltered.

Yet a further object of this invention is to provide a system for variable field partial write merging of data bits in memory words where word boundary crossing can occur.

A further object of this invention is to provide an improvement in digital data processing systems utilizing data words comprised of a predetermined number of bytes, each byte representing a predetermined number of bits, for providing variable field partial write merging of data bits in a memory word or words through the generation of bit masks and byte masks for all bit positions that are to remain unaltered during the partial write sequence.

Still a further object of this invention is to provide a system for variable field partial write merging of data bits in a memory word or words through the generation of bit masks output information to like-ordered bit positions in all bytes, through the selected activation of byte mask enabling for maintaining all bit positions unaltered, other than those bit positions selected for alteration.

Still a further object of this invention is to provide an improved system for variable field partial write merging of data bits in a memory word or words wherein the bit field to modified is contained within a single byte.

Yet a further object of this invention is to provide an improved system for variable field partial write merging of data bits in a memory word or words that is transparent to the memory reading and writing operation and does not add to the access time for reading and writing operations.

Still a further object of this invention is to provide an improved system for variable field partial write merging of data bits in a memory word or words upon programmable request that does not require counting circuitry or shift registers circuitry, and does not require complex programming.

It is a further object of this invention to provide an improved system for variable field partial write merging of data bits in a memory word or words upon programmable request that provides for word boundary crossing and minimizes wasted or unused memory capacity when bit fields of less than a full data word capacity are utilized.

Still a further object of this invention is to provide an improved system for providing variable field partial write merging of data bits in a memory word or words upon programmable request through the use of decoder and translator circuits utilized to generate mask bit configurations for retaining all unselected bit positions in the unaltered state.

These and other objects and advantages of the invention will become apparent to those having skill in art upon the reading of the following detailed description when taken in conjunction with the accompanying drawings in which:

DESCRIPTION OF THE DRAWINGS

FIG. 4 illustrates the format of the data word utilized in the embodiment of the invention;

FIG. 5 illustrates the format of the Bit Offset designation specified as the A Control or the A-Field which specifies the location in the data word of the Starting Bit of the variable field that is to be written;

FIG. 6 illustrates the format of the L Control that defines the Write Bit Field Length, and is designated as the L-Field;

FIG. 7 illustrates the format of the B-Control, referred to as the B-Field, and defines the start of the following bit positions that are to be masked;

FIG. 22a through FIG. 22b, when arranged as shown in FIG. 22, comprise the detailed logic arrangement for the Starting Bit Decoder/Translator, Trailing Bit Decoder/Translator, and the Bit Mask circuitry.

DESCRIPTION OF THE PREFERRED EMBODIMENT

Figure 1:
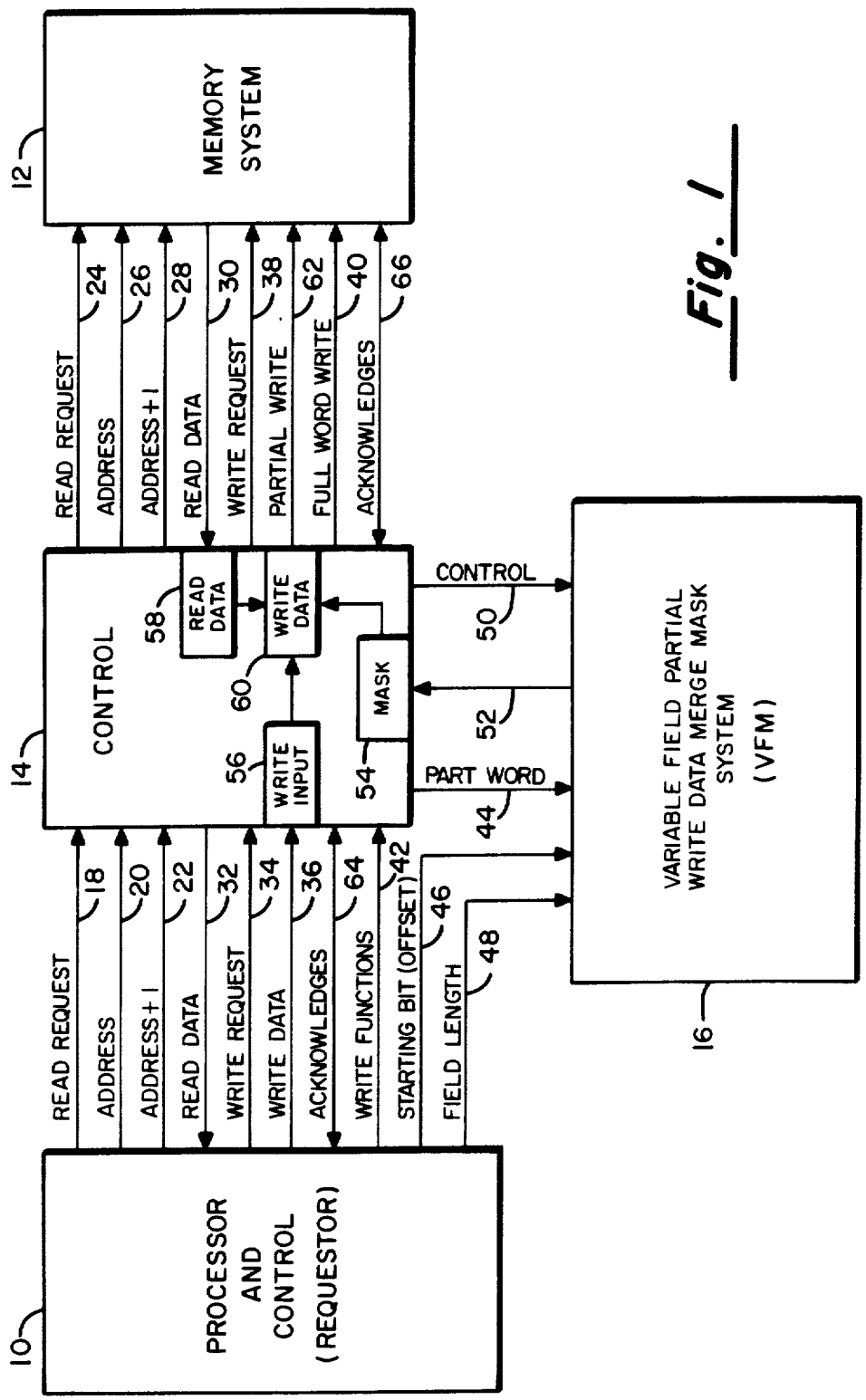
FIG. 1 is a simplified block diagram of a data processing system which incorporates the invention for providing variable field partial write merging of data bits in a memory word or words.

FIG. 1 illustrates a simplified block diagram of a data processing system which incorporates the invention, and contemplates use of a Processor and Control 10, alternatively referred to as a Requestor, a Memory System 12, Control 14, and the Variable Field Partial Write Data Merge Mask System, hereinafter referred to as VFM 16. The Processor 10 is characteristically a digital data processor that functions to respond to program instructions for manipulation of data words. The Memory System 12 is characteristically a system comprising a plurality of addressable memory registers together with the associated addressing and accessing circuitry, which is not shown in detail. It can be selected from directly addressable systems, or can utilize the so-called setassociative memory arrangement. It functions to store instruction words and operand words, alternatively collectively referred to as "data words". The Control 14 operates to control requested reading operations or requested writing operations from the Processor 10 and to correlate the timing for reading and writing operations in the Memory 12. It should be understood that there may be several processors or requestors attached to Control 14. In the event that more than one requestor is utilized, a priority arrangement of the type described in the U.S. Pat. No. 3,967,247, to Andersen, et al., could be utilized. For purposes of illustration of the system operation, it is sufficient to understand that the Processor 10 will issue a Read Request on line 18 when data words are required. At the same time of issuing the Read Request signal, an Address is transmitted on line 20, and an Address +1 will be transmitted on line 22. If the Memory System 12 is available for accessing, Control 14 will issue a Read Request signal on line 24 for accessing the Address specified on line 26 and the Address +1 specified on line 28. The Memory 12 will provide the requested addressed read data on line 30 to Control 14, which in turn will transmit the data to the Processor 10 on line 32. For the writing of data, Processor 10 will provide a Write Request on line 34 together with the address information previously described. The Write Data will be transmitted on line 36. The Control 14 will determine availability of the Memory 12 for writing by supplying a Write Request on line 38. When the Memory is available for writing, the data will be transferred on the Full Word Write data line 40 to be written at the address specified. The Processor 10 also provides writing function selection signals on line 42 which specifies the selection of full word write or partial word write. In the event that a variable field partial write is specified, a Part Word control signal is transmitted from Control 14 on line 44. In addition to specifying a Partial Write, Processor 10 also specifies the Starting Bit position of the variable field that is to be written by signals transmitted on line 46. It also supplies a set of control signals that define the variable field length that is to be written by signals on line 48. The VFM 16 responds to timing control signals received on line 50 to generate mask signals which are transmitted on line 52 for defining bit positions in the address memory registers that will not be altered during the Partial Write operation. The mask signals indicated by block 54 are combined with the Write Input signals shown as block 56 and the Read Data shown as block 58 to comprise the Write Data shown as block 60 which will be transmitted as the Partial Write signals on line 62 to the Memory System 12. The initiation and completion of reading and writing operations between the Processor 10 and Control 14 are signaled by Acknowledges on line 64 and the completion of operations between Control and Memory are signaled by Acknowledges on line 66.

In this system environment the VFM 16 will be transparent to the memory references, and due to the speed of the operation of the VFM in comparison to the cycle time of the Memory 12, it will in no way impede or slow down system operation.

Figure 2:
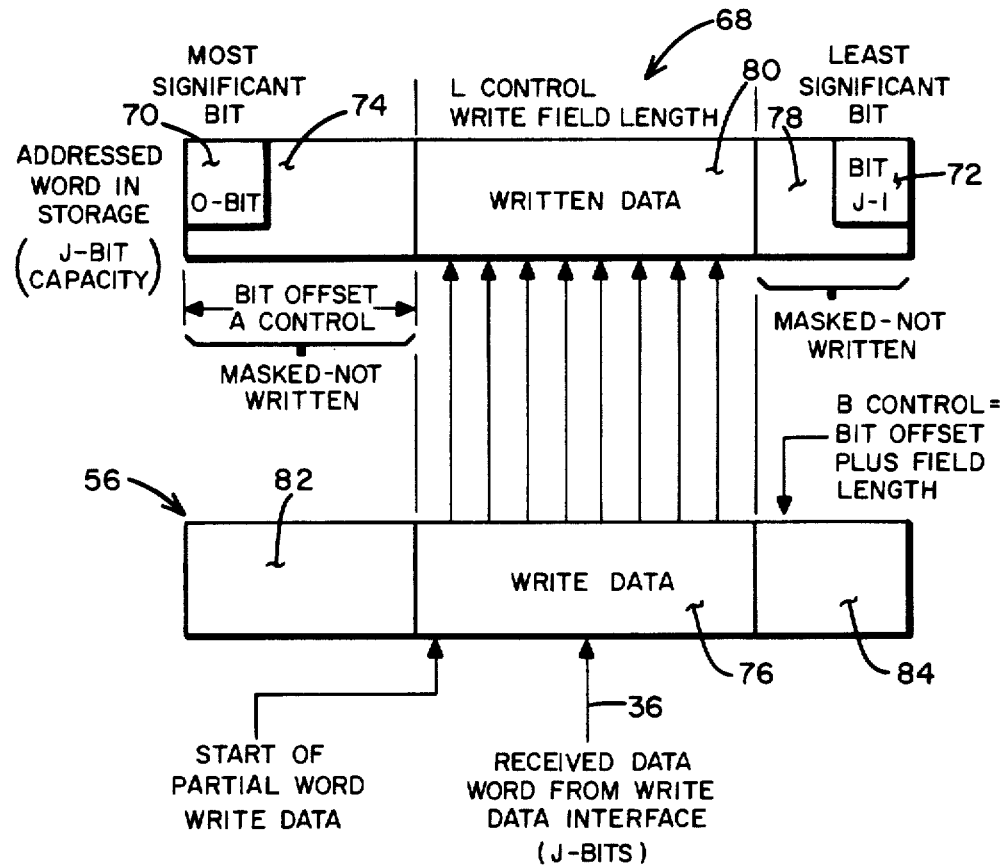
FIG. 2 illustrates a data flow for a variable field partial write where word boundary is not crossed.

FIG. 2 illustrates a data flow for a variable field partial write, where a word boundary is not crossed. A data word comprised of J-bits is transmitted on line 36 and will be designated as the Write Input 56 generally. The addressed word in storage will have a J-bit capacity as indicated by block 68 generally. It is arranged for this embodiment such that the most significant bit is designated as the 0-bit 70 and progressing in order of decreasing significance by increasing bit position designation until the least significant bit is designated as bit J-1 as indicated by block 72. The Bit Offset specifies the location of the Starting Bit of the variable field that is to be written from the referenced point of the most significant bit. The Bit Offset is designated as the A Control and will be shown as block 74. The Write Data shown as block 76 will be specified as to the number of contiguous bits of data that will be written by the Write Field Length, otherwise referenced as the L Control. The remaining bit positions in the addressed word illustrated as block 78 following the Written Data shown as block 80 will be masked in the memory system and will not be altered during the partial write operation.

The so-called following bits following the Written Data are determined by combining the Bit Offset and the Field Length to generate control signals that will be referenced as the B Control. It can be seen, then, that the data word 56 provided by the requestor will have the corresponding bit positions specified by the Bit Offset and the Field Length written in the address memory word, and the leading bits shown by block 82 and the following bits shown by block 84 will be ineffective to alter the addressed memory word due to the leading and following masks that are generated. The mask generation will be described in more detail below.

Figure 3:
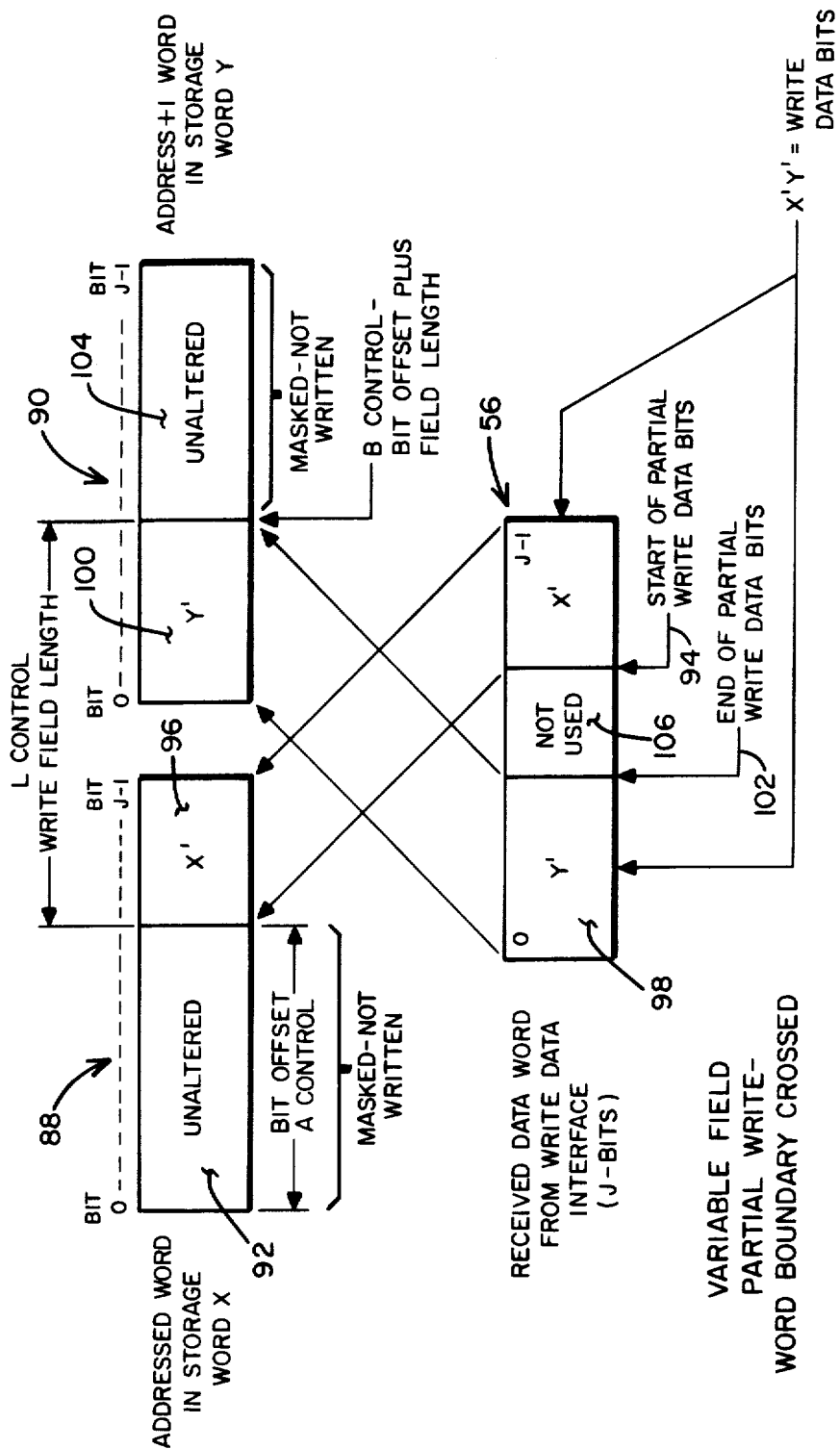
FIG. 3 illustrates a variable field partial write operation where a word boundary is crossed.

FIG. 3 illustrates a variable field partial write operation where a word boundary is crossed. In this configuration, the word addressed, designated word X, comprising J-bits, is referenced as word 88, and the address +1 word, designated as word Y, is designated by reference numeral 90. The J-bit data word 56 is received from the write data interface. Again, the A Control specifies the Bit Offset which results in bit positions designated by reference numeral 92 in word X, being masked and not written. The Write Field Length in this configuration is specified to be of sufficient magnitude to exceed the capacity of the remaining bit positions in word X, and requires that the balance of the bit positions to complete the Write Field Length extend into the sufficient bit positions of work Y. Accordingly, it can be seen that the start of partial write data bits indicated by arrow 94 defines a partial write field X' in the received data word 56 which is transferred to the bit positions in word X following the unaltered bits 92, as indicated by X' field 96. The bit positions corresponding to the Y' field 98 in the input data comprise the balance of the Write Field Length, and is transferred to the most significant bit positions in word Y indicated by the Y' field 100. The end of the partial write is specified by arrow 102, and defines the start of the B Control for defining the portion of word Y that is to be unaltered, as indicated by block 104. The bit positions specified by block 106 in the input data words are ineffective and are not utilized for the writing operation. Again, the generation of the leading and trailing mask bits will be described in more detail below.

FIG. 4 illustrates the format of the data word utilized in the described embodiment of this invention. The data word comprises 64 decimal bits with the 0-bit being the most significant bit position and increasing ordered numbers indicating decreasing bit-significance, to the least significant 63-bit position. The 64 decimal bit positions are equivalent to 100 octal bit positions, which can be represented as 0 through 77 octal, and can be represented in 6 binary bit positions. The data word is further divided into bytes, where each byte consists of 8 contiguous bit positions numbered 0 through 7 for each byte. In this arrangement, the most significant byte is the 0-byte and the least significant byte is the 7-byte. It should be understood that this configuration for the data word is illustrative only, and that it could utilized more or fewer bit positions.

FIG. 5 illustrates the format of the Bit Offset designation specified as a A Control. The A-Field specifies the location in the data word of the Starting Bit of the variable field that is to be written. The A-Field has the least significant bit positions designated as A0 and progresses numerically upwardly in significance. The three bit positions A0, A1, and A2 specify the Bit Offset within a byte. Since each byte contains 0 through 7 bit positions, the three bits can designate all possible bit positions within a byte. The A-Field bit positions A3, A4, and A5 specifiy the Byte Offset of the Starting Bit. Again, since there are 0 through 7 bytes in the data word, the three Byte Offset bits of the A-Field can specify all possible bytes. It is of course apparent that if more bytes would be utilized in a desired configuration, there would have to be added the A6 bit position for the A-Field. The A-Field can be of a range of 0 through the numerical value of the least significant bit position of a data word. This is essential so that the Starting Bit will occur somewhere within a starting word. As will be described in more detail below, the A-Field is utilized by the VFM to generate mask bits for bit positions in the data word that precede the Starting Bit of the variable field that is to be written.

FIG. 6 illustrates the format of the L Control that defines the Write Bit Field Length. The L Control is designated as the L-Field. For the 64-bit configuration described, the L-Field is comprised of six bit positions designated as L0 as the least significant bit position and increasing numerically to L5 as the most significant bit position. The six bit positions provide sufficient capacity to designate field length of 0 through 77 octal bit positions and is sufficient capacity to designate up to one complete word capacity of variable field bits that are to be written. If the L-Field is zero, it designates the condition to write a full data word capacity at the offset specified by the A-Field. If the L-Field is designated to be of a zero value, and the A-Field is designated to be a zero, the writing operation is a full word write, and the VFM is inoperative. As mentioned previously, if the data word capacity exceeds 64 decimal bits, it is necessary to add bit position L6 to provide the additional capacity to specify the maximum L-Field. The L-Field in conjunction with the A-Field designates the bit position in the variable field selection that are to be written, and further define the Trailing Bit of the variable field.

It should be noted that the designation Starting Bit and Trailing Bit are intended for purposes of identifying reference points in the variable field, and does not indicate that the variable field is serially written. Once the variable field is identified and the masks generated as hereinafter described, the writing operation is contemplated to occur with the variable field bits being written parallel.

FIG. 7 illustrates the format of B Control and is utilized to determine the following bit positions that are to be masked. The B control is designated as the B-Field, and is generated by the binary addition of the A-Field and the L-Field. Bit positions B0, B1, and B2 relate to the Trailing Bit, and as will be described in more detail below, will designate the bit position of the Trailing Bit +1, thereby indicating the first bit in the following bit positions in the data word that is to be masked. Bit positions B3, B4, and B5 define the numerical byte position of the byte in which the first bit of the bit positions to be masked will occur. As previously described, if the data word is selected to be larger than 64-bits, an additional bit position B6 will be required to provide adequate capacity to designate the additional bytes.

Figure 8:
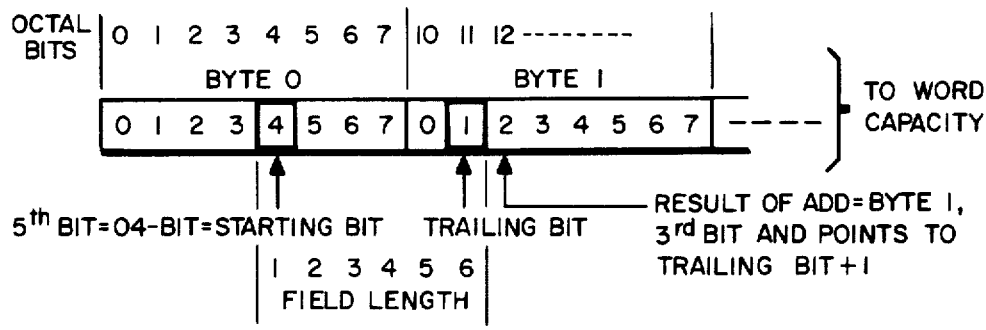
FIG. 8 illustrates the inter-relationship of the A-Field, the L-Field, and the B-Field.

FIG. 8 is an illustration of the inter-relationship of the A-Field, the L-Field, and the B-Field. If it is assumed that the Starting Bit is to be the fifth bit in a data word, that is, the 04-bit, it can be seen that the A-Field will be 0 for bit positions A3, A4, and A5 thereby indicating the Starting Bit is in the 0-byte and that the binary 100 indicates the 04-bit position. The Field Length for illustrative purposes is 6-bits which is binary 000110. The process of performing a binary add of the A-Field and the L-Field results in the B-Field which is binary 001010, that is octal 12. The Trailing Bit, is the 11-bit position of the word, which is equivalent to the 1-bit position of byte 1. From the B-Field, it can be seen that the first bit position of the following bits that are to be masked are defined as the 12-bit position of the word, which is equivalent of the 2-bit position of the 1-byte, that is the Trailing Bit +1.

Figure 9:
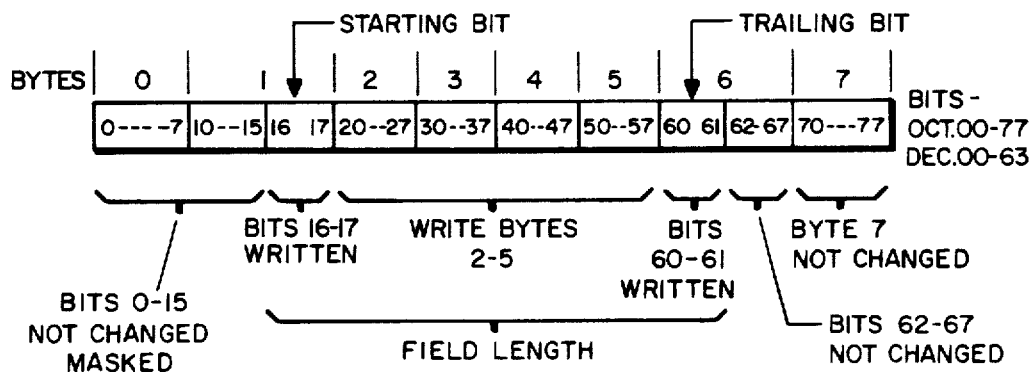
FIG. 9 is an example that illustrates writing of a selected variable field within a data word.

FIG. 9 illustrates a more detailed example that describes writing a decimal 36-bit variable field within a data word. In this example, the decimal 64-bit word has the bit positions octally numbered from 0 through 77. The Starting Bit has been selected to be the 6-bit in the second byte which is the octal 16-bit position of the word. This is equivalent to binary 001110. As stated, the decimal 36-bit Field Length is to be written, which is equivalent to octal 44 and is further equivalent to binary 100100. The addition of the A-Field and the L-Field yields a binary 110010, which is the equivalent of octal 62 and defines the B-Field. For this example, then, it can be seen that bit positions 0 through 15 are masked and are unchanged and are referred to as the leading bit positions. The Starting Bit is the 16-bit position and bit positions 16 and 17 in the 1-byte are written. Bytes 2, 3, 4, and 5 are completely written. Bit positions 60 and 61 in the 6-byte are written, and the Trailing Bit is the 61-bit position. Bit positions 62 through 67 in the 6-byte are masked and not changed, and the entire 7-byte is masked and unchanged. The bit positions of the word occuring in lower order of significance from the Trailing Bit are referred to as the masked following bits. Again, the terms "leading", "following" and "trailing" are provided for point of reference, and do not denote serial operation.

Figure 10:
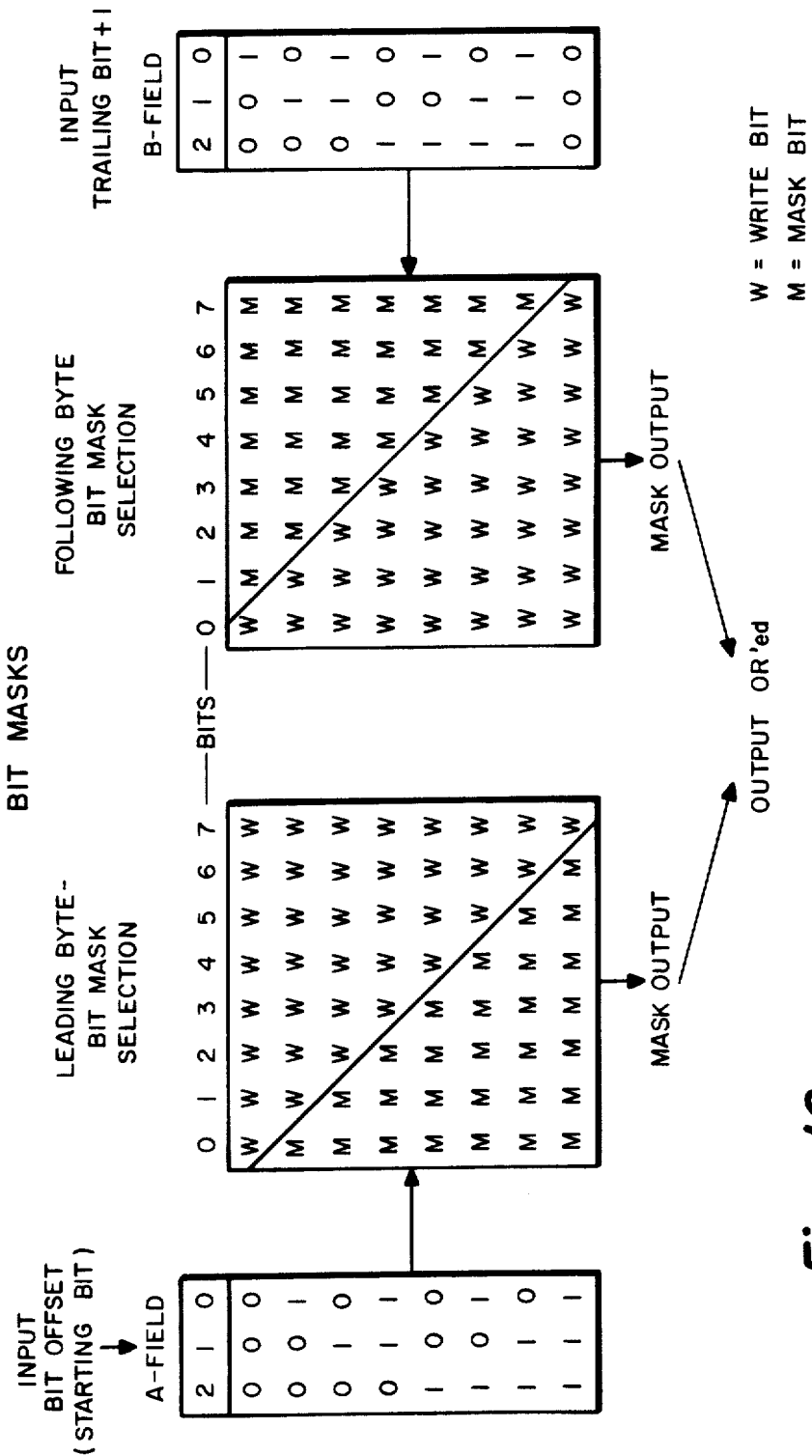
FIG. 10 illustrates graphically the Bit Mask configuration for the Bit Offset specified in the A-Field and the Trailing Bit +1 specified in the B-Field.

FIG. 10 illustrates graphically the Bit Mask configuration for the Bit Offset specified as the A-Field and the Trailing Bit +1 specified as the B-Field. From the example described in FIG. 9, the A-Field would be the 6-bit position of the 1-byte. The binary 110 would result in the mask bits M for the 0, 1, 2, 3, 4, and 5-bit positions. The Trailing Bit +1 in that example was specified to be the 2-bit of the 6-byte. Reading down the B-Field in FIG. 10 to the binary 010 it can be seen that the mask bits M are generated for the 2, 3, 4, 5, 6, and 7-bit positions. The generation of the mask fields for the leading and following bit positions will be under timing control that will be described in more detail below. It will be made clear that the Bit Masks are OR'ed for providing part of the final merge mask bit configuration.

Figure 11:
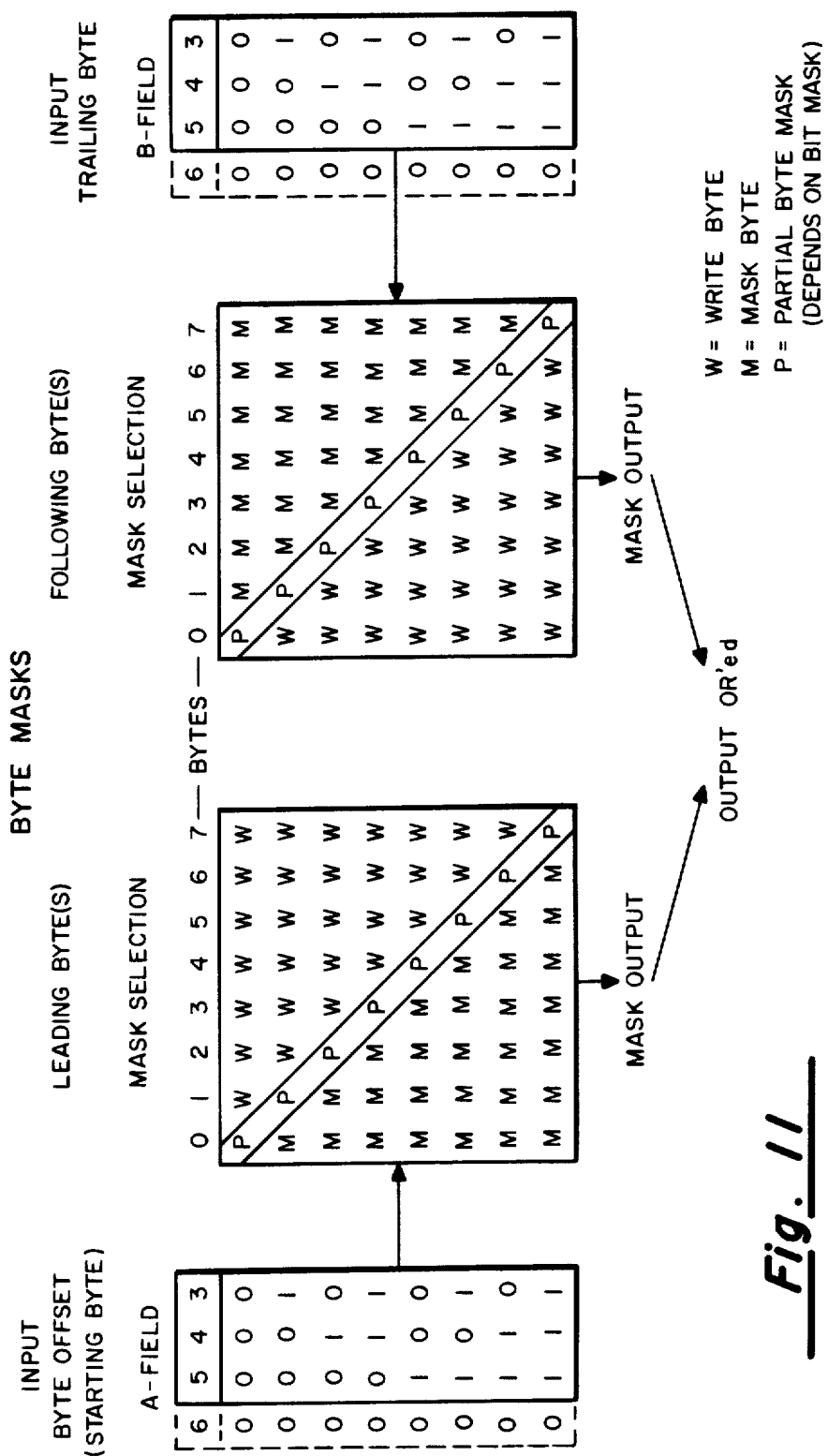
FIG. 11 illustrates the Byte Mask output configuration for the Byte Offset portion of the A-Field and the Trailing Byte specified in the B-Field.

FIG. 11 illustrates the Byte Mask output configurations for the Byte Offset portion of the A-Field and the Trailing Byte specified as the B-Field. As just described with regard to the Bit Mask, bytes occurring ahead of the Starting Bit will be masked, as will the bytes occuring following the Trailing Bit. These Byte Mask Bit configurations are also OR'ed to form the final mask configuration. Again, the example described with respect to FIG. 9 can be applied to the Byte Mask illustration in FIG. 11, and the Byte Offset will be seen to be a designation of the 1-byte. Reading across, the mask configuration will be designated by the M indications, and the P indication represents the Starting Byte which is partially masked as determined by the appropriate bit mask, as determined with reference to FIG. 10. In this example, then, the 0-byte will be totally masked and will comprise a Read Data Byte. The 1-byte will be partially masked in the bit configuration previously selected, and the balance of the bytes will be indicated as Write Bytes. This final determination of which bytes will be totally written will depend upon the evaluation of the Trailing Byte.

In the example considered, the Trailing Bit has been found to be located in the 6-byte. In FIG. 11, the B-Field of binary 110 gives the selection of the masking configurations for the Trailing Bits and Trailing Bytes. For this example, the 7-byte is a Read Data Byte and is totally masked as indicated by the M in the 7-bit position. Since the Trailing Bit occurs in the 6-byte, the designation P indicates that it is a partial mask and that the 6-byte is a Partial Write Data Byte. The masking within the 6-byte will be under control of the bit mask as derived from the output of FIG. 10.

The Byte Mask selected for output are OR'ed, and in conjunction with the Bit Mask define the total masking selections. For the various positions of the Starting Byte and Trailing Byte, there will be the partial masking designated by the P entries in the mask tables.

The writing of a full 64-bit word in either a direct word location, or offset, gives rise to a special condition that will be described in more detail below, it being understood that the L-Field starts with the numerical 1 and extends numerically through one full bit capacity of a memory word. This provides that 63-bits can be designated in the L-Field, and leads to the condition that an L-Field of all zeros represents a full 64-bit word write.

For systems having word capacity greater than 64-bits, the appropriate number of extra bytes will be added and the masking system will be thus expanded to accomplish the variable field partial write function. The detailed circuitry and timing for the generation of the Bit Mask and Byte Mask configurations will be described in more detail below.

For purposes of further reference, a Read Data Byte, either leading or following, will be defined as a byte that is to be totally masked. This means that the byte will be read from the memory, totally masked, and unaltered by the partial write operation. A Starting Partial Write Data Byte is defined as the byte in which the Starting Bit is located. A Trailing Partial Write Data Byte is defined as that byte in which the Trailing Bit is located. The Starting and Trailing Partial Write Data Bytes will each contain one or more bits that are to be written, and may or may not include any bits that are to be masked, depending upon the location of the Starting Bit and the Trailing Bit, respectively. A Write Data Bye is defined as a byte that is to be totally written as a part of the variable field in partial data write operation.

Figure 12:
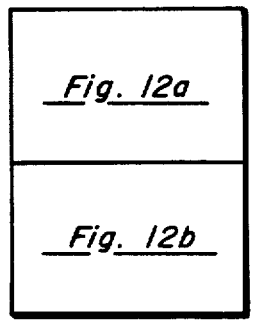
FIG. 12a and FIG. 12b, when arranged as in FIG. 12, is a simplified block diagram of a portion of a data processing system that incorporates the subject invention.

FIG. 12 is a simplified block diagram of a portion of the data processing system that incorporates the subject invention. The Memory System 12 includes Address Selection circuitry shown as block 110, and is arranged for receiving the address on line 26 and the address +1 on line 28. The Memory reads the even address word on line 30a to the Read Register-E 112. The Memory reads the odd address word over line 30b to the Read Register-0 114. For a reading operation, the data word stored in Read Register-E 112 is transmitted on line 116 to the Read Data Multiplexer 118, and the output from Read Register-0 114 is transmitted on line 120 thereto. The Read Data Multiplexer 118 functions to select the appropriate addressed word for transmission on line 122 to the Read Data Interface 124 for transmission on line 32. The details of this circuitry will not be discussed or shown in detail, since it does not add materially to an understanding of the invention. The data word stored in the Read Register-E 112 is also transmitted on line 116a to the Write Data Multiplexer-E 126. Similarly, the data word stored in the Read Register-0 114 is transmitted on line 120a as one set of input signals to the Write Data Multiplexer-0 128.

The data word to be written is transmitted from a Requestor on line 36 to the Write Data Interface 130, which transmits the data word on line 132 to the Input Write Data Register 134. The input write data word is transmitted on line 136-E as a second set of input signals to the Write Data Multiplexer-E 126. The input write data word is transmitted over line 136-0 to the Write Data Multiplexer-0 128.

When a Partial Write Mode is selected, the Requestor will transmit the Bit Offset over line 46 to the A-Register 138, and will transmit the Field Length to the L-Register 140 over line 48. The A-Field is transmitted on line 142 as one set of input signals to the Variable Field Partial Write Data Merge Mask control circuitry 144. At the same time, the A-Field is transmitted on line 146 as one set of parallel input signals to Adder 148. The second set of input signals to the Adder is provided from the L-Register 140 over line 150. The result of the addition in Adder 148 is the generation of the B-Field which is transmitted on line 152 as the second set of controlling input signals to the VFM 144. The VFM also receives control signals on line 50, and a Partial Write Control signal on line 44. The VFM functions to generate mask signals and control signals on line 154 as a third set of input signals to the Write Data Multiplexer-E 126 and results in the selection of the Read Data bits that will be masked and the bit positions that will be written pursuant to Data Bits stored in the Input Write Data Register 134. The selected bit configuration is transferred on line 156 to the Write Register-E 158 which in turn stores the merged word in the Memory 12. Similarly, the VFM provides mask signals and control signals on line 160 as the third set of input signals to the Write Data Multiplexer-0 128. These mask signals and control signals select the Read Data bits that will be masked and returned to the memory unaltered, and select the input data bits that will be written. The bit configuration thus generated will be transferred on line 162 to the Write Register-0 164, and will in turn be transferred to the Memory 12 for storage.

Figure 13:
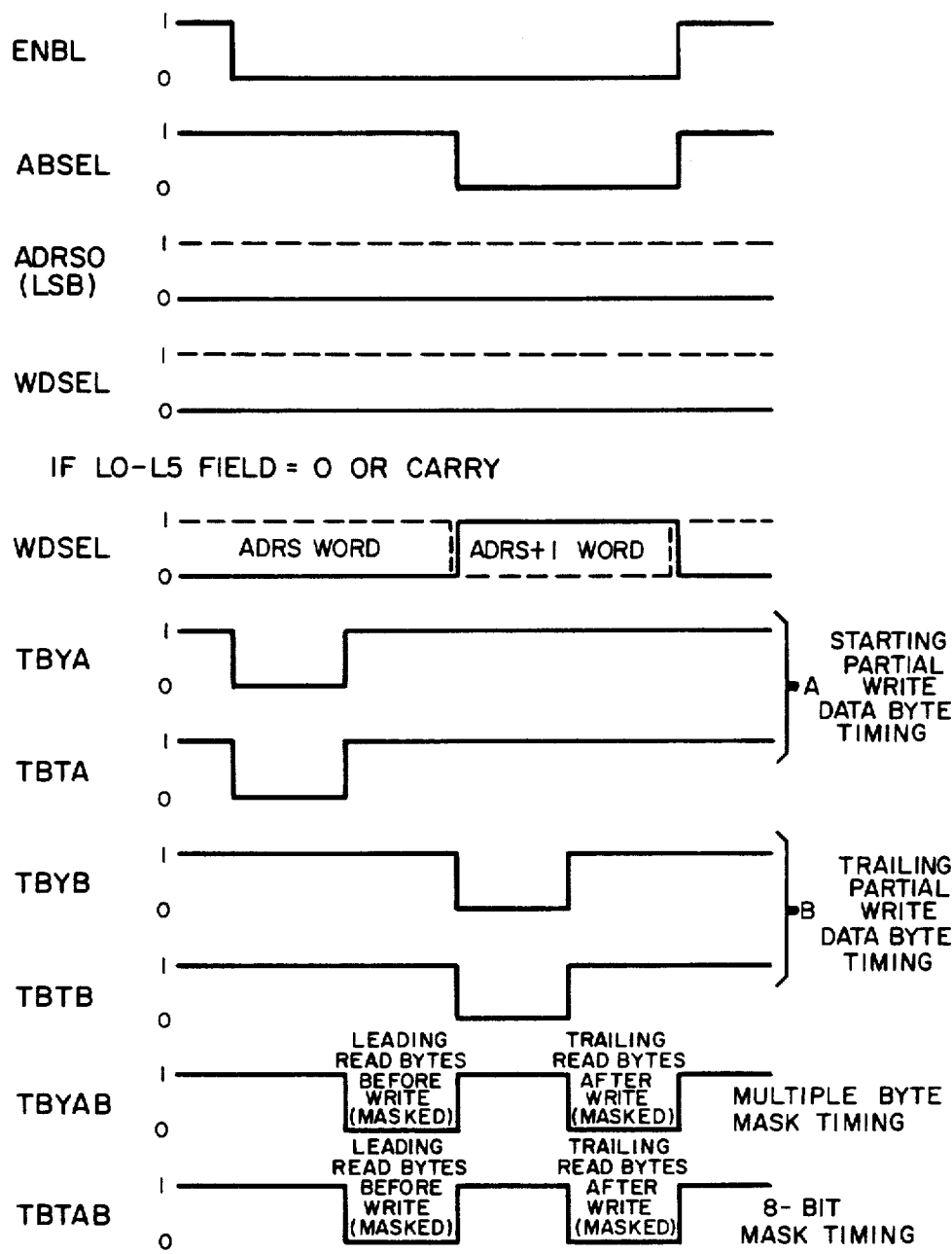
FIG. 13 illustrates the various control and timing signals utilized in the functioning of the improved system for providing variable field partial write merging of data bits in a memory word or words upon programmable request.
Figure 14A:
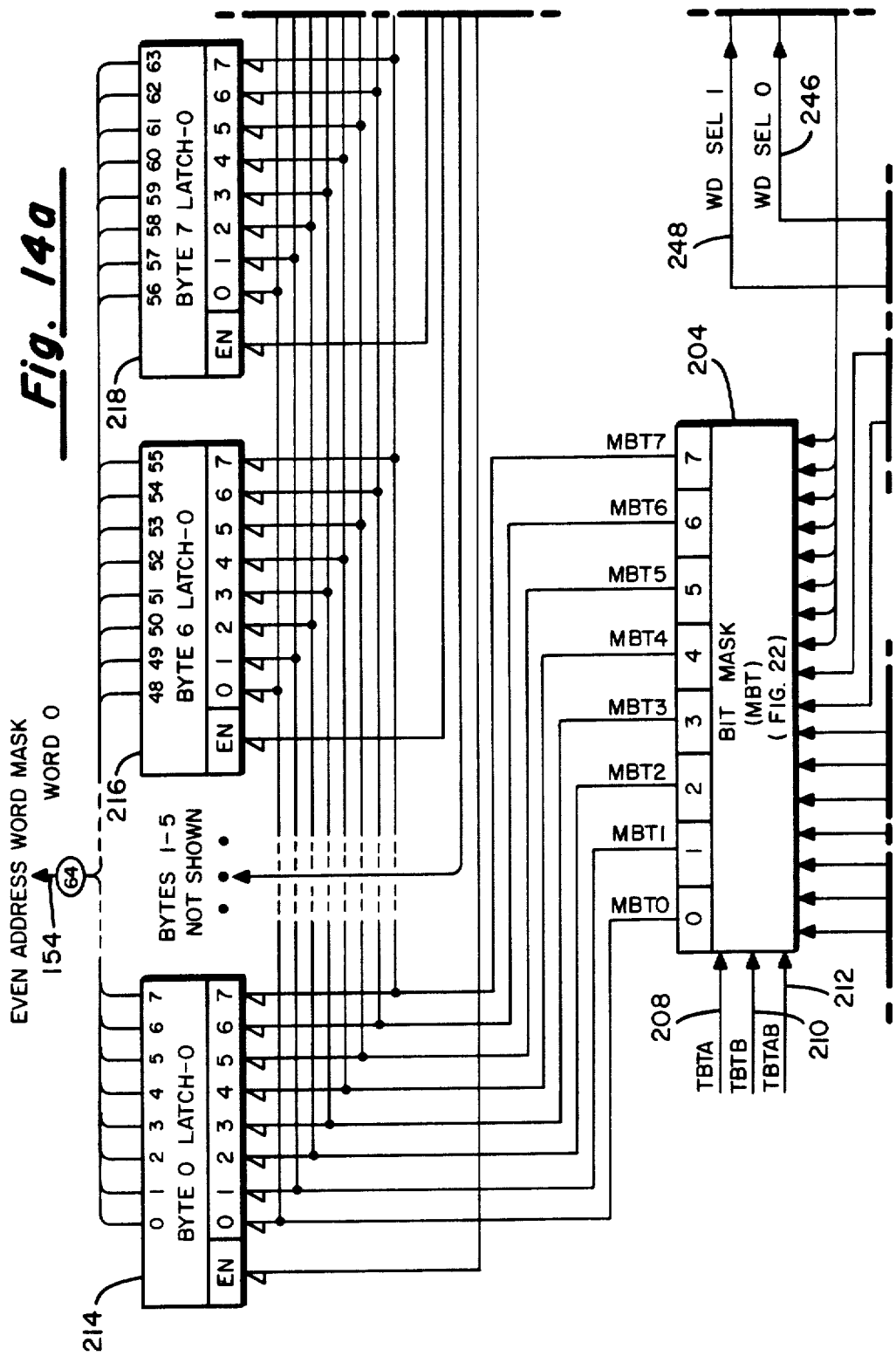
Figure 14B:
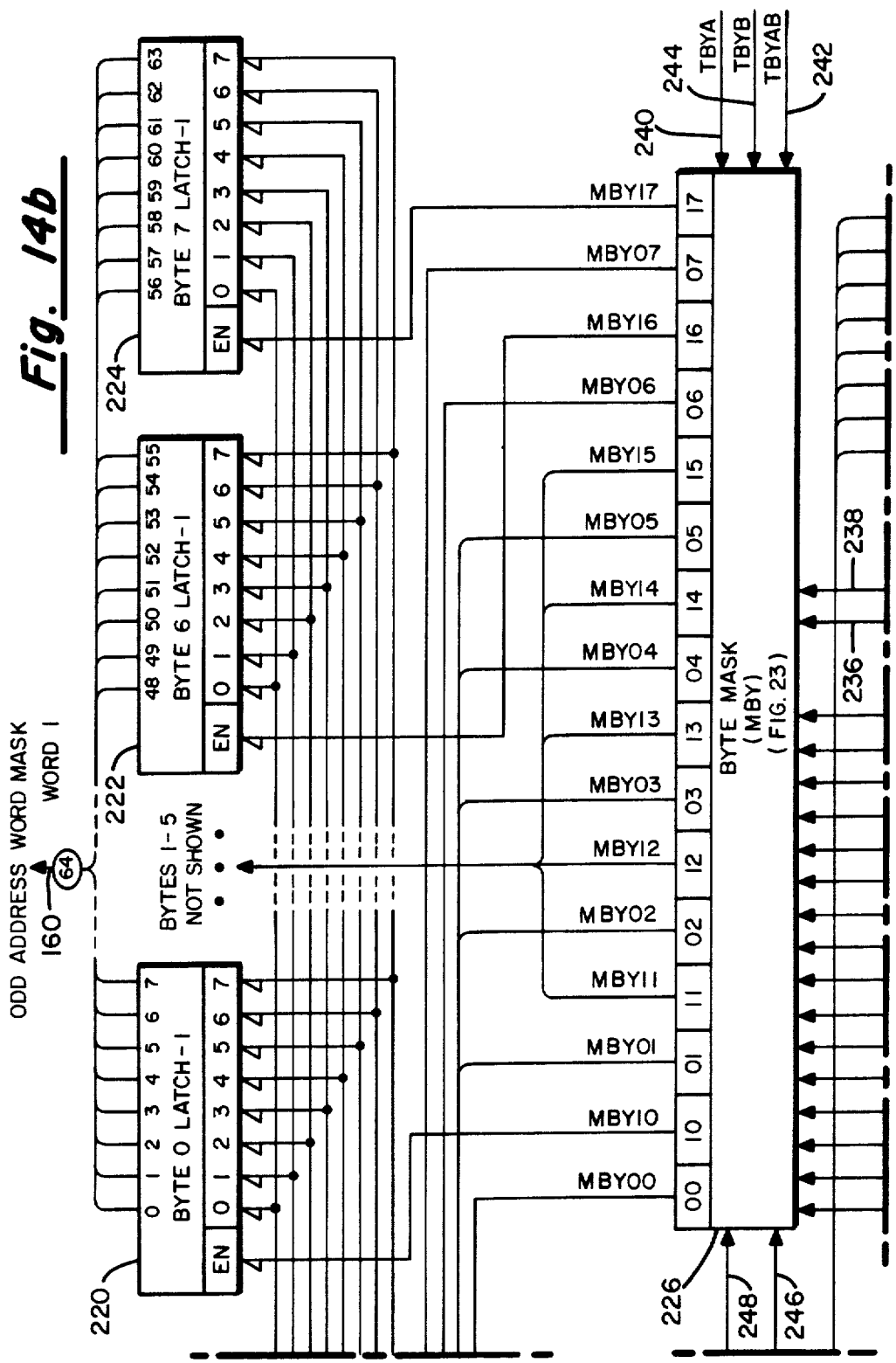
Figure 14C:
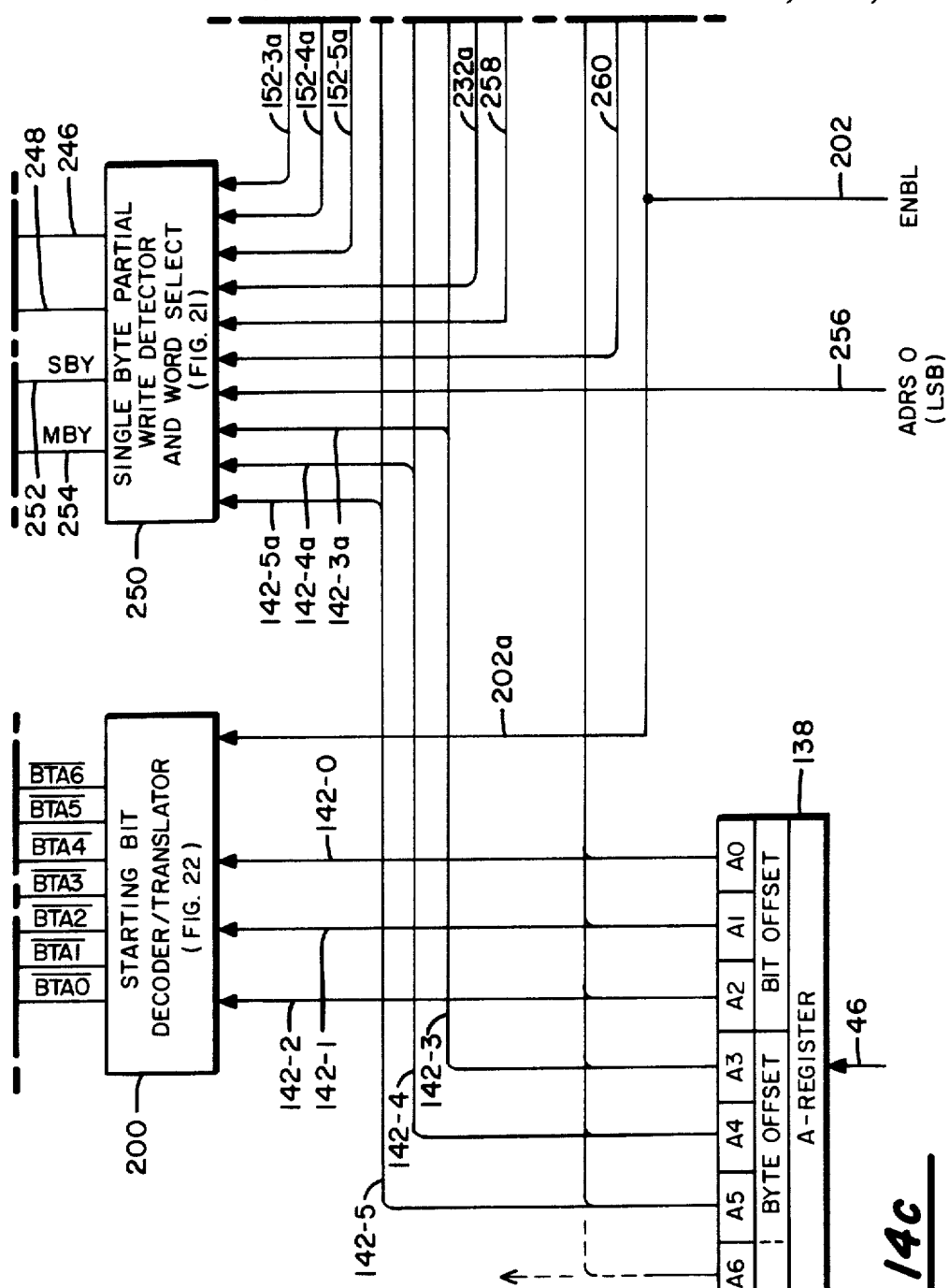
Figure 14D:
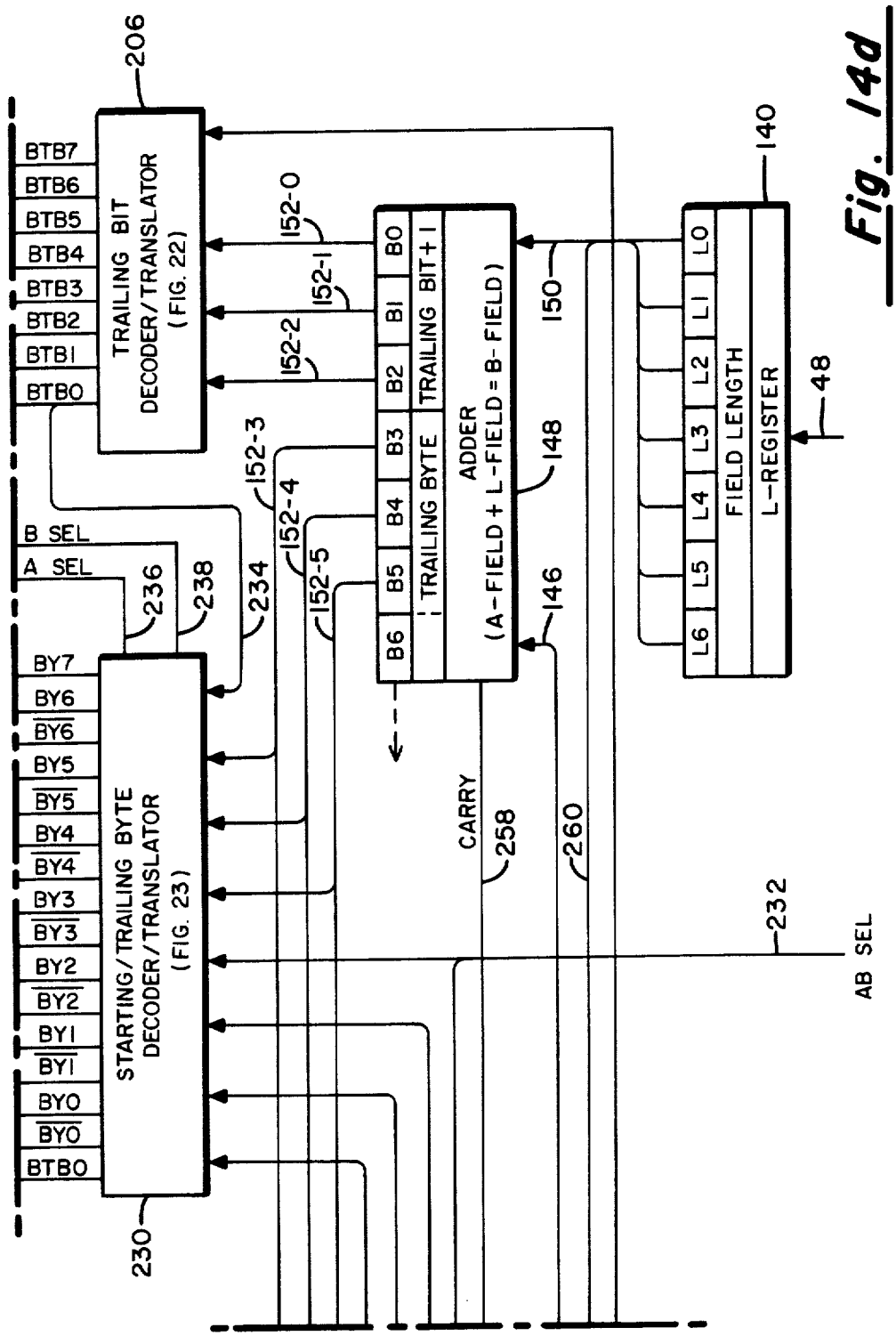

Before progressing to descriptions of the detailed circuit operations, the control signal and timing signal arrangements will be described. FIG. 13 illustrates the various control and timing signals utilized in the functioning of the VFM. The sequence of the VFM is activated by the occurence of the Enable signals, labeled ENBL. The control signals and timing signals illustrate signal relationships, and are not related to specific time intervals, it being understood that the precise time intervals will depend upon the selection of the circuitry utilized to implement the VFM. Further, the specific timing will relate to the timing of the requestor and the memory system.

As previously mentioned, the generation of the mask signals is divided into two portions. The first portion involves the evaluation of the position of the Starting Bit in the address word, and the determination of the mask signals that must precede the Starting Bit. The generation of these mask signals will be generated in the A portion of the VFM sequence. The mask bits that are generated to follow the Trailing Bit are generated in the B portion of the VFM sequence. Since the sequence is divided, the control signal AB Select, labeled AB SEL, illustrates the division of the VFM cycle for providing the A and B control functions.

As mentioned previously, two data words are read from the memory yielding an odd addressed word and an even addressed word. Since the words are addressed in a binary code, the least significant digit in the address will indicate whether the address is odd or even. This will determine which of the words should be initially accessed. The least significant bit position of the address, labeled ADRS 0, will provide a pointing function to select which of the words will be referenced initially. If the least significant bit is a binary 0, the even addressed word will be initially selected, and if a binary 1, the odd addressed word will be selected.

Since a word boundary crossing can occur, an additional control signal for switching the word selection must be utilized. This control signal is the Word Select, labeled WD SEL. In the single word reference situation, where a word boundary crossing does not occur, the Word Select will correlate to the least significant bit value in the address. For those situations where a word boundary crossing occurs, that is when a carry is generated from the adder, or when the B-Field is 0, the Word Select signal will be toggled.

The balance of the signals illustrated in FIG. 13 are timing signals. Table I defines the timing symbols illustrated.

TABLE I

| T | TIMING OF |
|---|---|
| BT | BIT |
| BY | BYTE |
| A | LEADING |
| BTA | LEADING 0 TO 7 BIT MASK |
| BYA | LEADING 0 TO 7 BYTE MASK |
| B | TRAILING |
| BTB | TRAILING 0 TO 7 BIT MASK |
| BYB | TRAILING 0 TO 7 BYTE MASK |
| AB | LEADING OR TRAILING PER AB SEL. |
| BTAB | LEADING OR TRAILING 8-BIT(S) |
| BYAB | LEADING OR TRAILING BYTE CONTAINING 0 TO 7 BIT MASK |
| M | MASK |

During the A portion of the VFM cycle, the Starting Partial Write Data Byte is evaluated for location of the Starting Bit and the location of the Starting Byte. To this end, TBYA provides the timing signal during which the Starting Byte is identified, and TBTA provides the timing during which the Starting Bit is located, and the leading bits are masked.

Following the Starting Bit location, the TBYAB and TBTAB signals are generated during the A portion of the VFM cycle. The TBYAB signal causes the Leading Read bytes to be masked and the TBTAB causes the like-leading bits to be masked. At the switching of the AB Select into the B portion of the VFM cycle, the circuitry switches to evaluate the trailing bits that are to be masked.

The TBYB signal provides timing for the evaluation of the Trailing Partial Write Data Byte, and the TBTB signal provides timing of the location of the Trailing Bit.

During the occurence of the TBYAB and the TBTAB signals during the B portion of the cycle, the Trailing Read Bytes and the bits following the Trailing Bit are masked.

Figure 14:
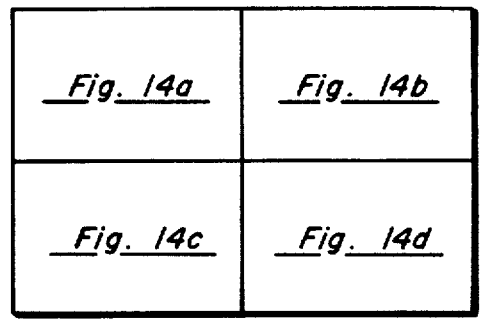
FIG. 14a through FIG. 14d, when arranged as shown in FIG. 14, comprise a block diagram of the variable field partial write data merge mask system and input control.

FIG. 14a through FIG. 14d, when arranged as shown in FIG. 14, comprise a block diagram of the variable field partial write data merge mask system and input controls. Elements that have been previously desctibed will bear the same reference numerals.

The A-Field is stored in the A-Register 138, and the Field Length is stored in the L-Register 140. The required input signals for generation of the Bit Mask for the Starting Bit is performed by the Starting Bit Decoder/Translator 200. It receives the A0 signal on line 142-0, the A1 signals on line 142-1, and the A2 signal on line 142-2. The Enable signal is applied on line 202, and is fed on line 202a to the Starting Bit Decoder/Translator 200. This circuit 200 functions to decode the three bit input specifying the Starting Bit to a signal on one-of-eight possible internal lines. The circuit 200 then functions to translate this decoded signal and apply it to all subsequent output lines. Thus, for the Starting Bit translation, all of the subsequent bits will be identified as bits to be written. Conversely, all bits not selected will be bits that are subject to the leading masking function. The Starting Bit Decoder/Translator circuit 200 provides output lines labeled $\overline{BTA0}$, $\overline{BTA1}$, $\overline{BTA2}$, $\overline{BTA3}$, $\overline{BTA4}$, $\overline{BTA5}$, and $\overline{BTA6}$, all of which are applied to the Bit Mask circuitry 204.

The contents of the A-Register 138 is applied as a parallel input on line 146 to Adder 148. The contents of the L-Register 140 is applied on line 150 as the other set of inputs to Adder 148. As previously described, the result of this addition produces the B-Field, and bits B0, B1 and B2 are representative of the Trailing Bit +1 and are applied on lines 152-0, 152-1, and 152-2, respectively, to the Trailing Bit Decoder/Translator 206. This circuit 206 also functions to decode the three bit input to one-of-eight internal lines, which in turn are translated such that the selected line and all subsequent output lines are activated. It provides output signals BTB0, BTB1, BTB2, BTB3, BTB4, BTB5, BTB6, and BTB7 which are all transferred to the Bit Mask circuitry 204. In this configuration, then, it can be seen that the identification of the Trailing Bit +1 and all subsequent bits will be identified for masking, which in turn will identify the preceding bits for writing. The specific circuit configuration and operation for Decoder/Translator circuits 200 and 206 will be described in more detail below.

The TBTA signal is applied on line 208, TBTB is applied on line 210, and TBTAB is applied on line 212 as timing control signals to the Bit Mask circuitry 204. During time TBTA, the decoded and translated output signals from the Starting Bit Decoder/Translator circuitry 200 are utilized to select the appropriate output lines for establishing the bit mask condition. The output signals are applied on the mask output lines identified as MBT0, MBT1, MBT2, MBT3, MBT4, MBT5, MBT6, and MBT7. The mask bit signals are applied to like-ordered stages of a plurality of 8-bit latch circuits, each of which are associated with a specific byte in the Word 0 and Word 1. Only three of the eight latch circuits utilized for Word 0 are shown, with Byte 0 Latch-0 labeled 214, Byte 6 Latch-0 labeled 216, and Byte 7 Latch-0 labeled 218. The latch circuits for bytes 1 through 5 of the Word 0 are similarly arranged but are not illustrated. Similarly, only three of the 8-bit latches for Word 1 are shown, with Byte 0 Latch-1 labeled 220, Byte 6 Latch-1 labeled 222, and Byte 7 Latch-1 labeled 224, with bytes 1 through 5 of Word 1 not illustrated. Each of these 8-bits latch circuits are selected from circuits available commercially, and function such that when an enable signal is applied, it will receive and store the setting signals applied thereto. The circuit functions to provide the stored signal combinations on the output terminals, which for Word 0 would be the 64 lines collectively referenced as line 154, and for Word 1 would be the 64 lines collectively referenced as output line 160. The Enable signals utilized to activate the various latch circuits are derived from the Byte Mask circuitry 226 which will be described in more detail below.

It can be seen, then, that during time TBTA, that the Bit Mask circuitry 204 provides the appropriate mask bit configuration for the Starting Bit and applies the bit configuration to all the latches. The particular latch that will be set will be determined by the appropriate enable received from the evalutation of the byte selection. In the A portion of the cycle, the application of TBTAB on line 212 results in the Bit Mask circuitry 204 switching to provide masked bits on all output lines for application to the 8-bit latches, for setting the mask configurations for all full Read Bytes, that is all leading bytes that are not to be written.

During the timing pulse TBTB, which is applied on line 210, the Bit Mask circuitry 204 responds to the output signals from the Trailing Bit Decoder/Translator 206 and functions to set up the mask bit configuration for the Trailing Bit. These mask signals are again applied to all like-ordered bit positions for all of the latch circuits, and the latch that is appropriately enables will be set to the mask configuration established for the Trailing Bit. During the B portion of the cycle, the Bit Mask circuitry 204 will be switched to provide 8 bits of mask output and will be applied to the latches which will select and set the mask configuration for all Trailing Read Bytes.

It can be seen, then, that the generation of Bit Mask signals is independent of the word selection. The special case of a Starting Bit and a Trailing Bit occurring in the same byte will be described below.

The evaluation of the Starting Byte and Trailing Byte involves the evaluation of the Byte Offset comprising the A3, A4, and A5 bit positions of the A-Register 138, and the Trailing Byte portion of the B-Field at the output of the Adder 148, comprising bits B3, B4, and B5. The Starting/Trailing Byte Decoders/Translator 230 receives input signals from the A-Register 138 on lines 142-3, 142-4, and 142-5, and from the Adder 148 on lines 152-3, 152-4, and 152-5. It also receives the AB Select signal on line 232. The Byte Decoder/Translator 230 functions based upon the status of the AB Select signal to either decode the Byte Offset received from the A-Register 138 or the Trailing Byte designation received from the Adder 148. Accordingly, it functions as a 3-bit decoder to select one of the eight possible conditions specified in these alternative cases. It functions further to translate the decoded signal to provide the output signal on the selected line together with all other subsequent output lines. It provides true output signals on lines labeled consecutively BY0 through BY7 and complementary output signals on lines labeled $\overline{BY0}$ through $\overline{BY6}$.

The BTB0 signal is applied on line 234 as one of the input signals, and the Byte Decoder/Translator 230 also provides the output signals A Select on line 236 and the B Select on line 238.

During the A portion of the cycle, as indicated by the presence of the A Select signal and during timing pulse TBYA, which is received on line 240, the Byte Mask circuitry 226 establishes the byte in which the Starting Bit occurs and provides the appropriate output for enabling the Starting Byte latch setting. During the occurence of the timing signal TBYAB which is received on line 242, the Byte Mask circuitry enables all of the leading lines for causing the Read Bytes to be masked. During the B portion of the cycle, as established by B Select signal, the timing pulse TBYB, received on line 244, it enables the appropriate latch circuit for establishing the bit mask configuration for the Trailing Byte. Upon the occurence of TBYAB during the B portion of the cycle, all of the following Read Bytes will be enabled and the total masking thereof will be accomplished by application of the output signals from the Bit Mask circuitry 204.

The Byte Mask circuitry 226 is adapted for controlling the latches that are applicable both to the word 0 and word 1. To effect this control, two additional control signals are necessary, which are the Word Select 0 signal received on line 246 and the Word Select 1 signal received on line 248. The Byte Mask circuit 226 output signals directed to control Word 0 are identified as MBY00 through MBY07, and the mask output signals to control the Word 1 latches are identified as MBY10 through MBY17.

The Single Byte Partial Write Detector and Word Select 250 functions to determine whether there is to be a Single Byte Write, indicated by the SBY signal on line 252 or whether there is to be a Multiple Byte Write indicated by the MBY signal on line 254. It also functions to perform the word selection by providing the Word Select 0 signals on line 246 and the Word Select 1 signal on line 248. During the word boundary crossing, as will be described in detail in the consideration of the detailed circuitry, Word Select circuitry 250 will function to toggle the word selection during the B portion of the variable write cycle. The initial word selection results from an evaluation of the least significant bit position of the address, received as an input signal on line 256. When the least significant bit position is 0, Word 0 is selected, and when the least significant bit is 1, Word 1 is selected.

The word boundary crossing will occur when a Carry signal is provided by Adder 148 on line 258. It will be recalled that it is a system requirement that the Starting Bit occur in the addressed word. When the addition of the Field Length to the Bit Offset results in the Carry being generated, it indicates that the Trailing Bit extends beyond decimal 64 bits, hence occurs in the address +1 word. The Word Select 250 also receives the input from the L-Register 140 on line 260, and includes circuitry to detect when the contents of the L-Register is 0. As previously mentioned, the selection of a full 64-bit variable write field will result in stages L0 through L5 being 0. Therefore, if there is any displacement of the Starting Bit, the variable field will extend into the next word and there will be a word boundary crossing. The selection of the time for toggling the word selection is accomplished by utilization of the AB Select signal received on line 232a.

For purposes of evaluating whether the variable field occurs within a single byte, or extends over multiple bytes, the Single Byte Partial Write Detector circuitry 250 receives the input signals from the A-Register 138, wherein A3 is received on line 142-3a, A4 is received on line 142-4a, and A5 is received on line 142-5a. It also receives signals from the B-Field, and receives the signals from stage B3 on line 152-3a, from B4 on line 152-4a, and from B5 on line 152-5a. These input signals from the A-Field and from the B-Field are evaluated, and if it is determined that both the Starting Bit and the Trailing Bit are situated in the same byte, the SBY signal will be generated on line 252. When it is determined that the Starting Bit and the Trailing Bit occur in different bytes, the MBY signal will be generated on line 254. These signals SBY and MBY are utilized in the Bit Mask circuitry 204 for controling the generation of the bit masks.

Having described the system operation in block diagram form, and having discussed the inter-relationship of the control signals, the timing signals, and the field selections, attention will be directed to the discussion and description of the detailed logic block diagrams utilized in the implementation of the preferred embodiment of the subject invention. In the logic block diagrams, the various blocks are representative of circuits that are available commercially for performing the logical functions. The flag representation indicates the direction of data and control flow. For purposes of definition, a binary 0 is represented by a low signal, hereinafter referred to as L, and a binary 1 is a high signal, hereinafter referred to as an H signal. The logic symbols utilized in the detail logic block diagrams will be described.

Figure 15:
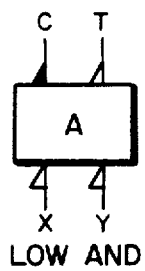
FIG. 15 is the logic block symbol for a Low AND circuit.

FIG. 15 is the logic block symbol for a Low AND circuit with the input signals denoted X and Y. The true output terminal is identified as T, and the complement output as C. This circuit will provide a low signal on the T output when X and Y are both low. This condition will result in a high signal on the C output. If either X or Y or both X and Y are high, the T output will be high and the C output will be low.

Figure 16:
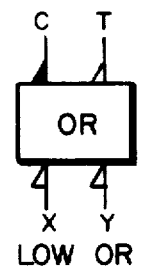
FIG. 16 is the logic block diagram of a Low OR circuit.

FIG. 16 is the logic block diagram of a Low OR circuit having input terminals designated as X and Y and the true output terminal designated T and the complement of it designated C. This circuit will provide a low signal on the T output when either X or Y or both X and Y are low. When both X and Y are high, the T output will be high and the C output will be low.

Figure 17:
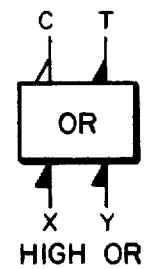
FIG. 17 is the logic block diagram for the High OR circuit.

FIG. 17 is the logic block diagram for the High OR circuit that provides a high signal at the T output terminal when either or both X and Y input signals are high. The circuit provides a high output signal at the C output terminal when both X and Y are low.

Figure 18:
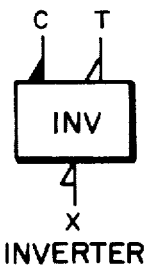
FIG. 18 is the logic block diagram symbol of an Inverter circuit.

FIG. 18 is the logic block diagram symbol of an Inverter circuit having input X and output terminals T and C. When a low input signal is applied at X, the True output signal will be low and the C output will be high. When the input signal is high, the T output will be high and the C output will be low.

Figure 19:
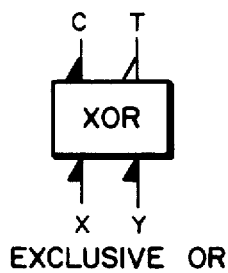
FIG. 19 is the logic block diagram symbol for an Exclusive-OR circuit.

FIG. 19 is the logic block diagram symbol for an Exclusive-OR circuit having input signals X and Y with output signals T and C. This circuit operates to provide a low output signal at the T output terminal when either X or Y is high. When X and Y are both low or both high, the T output signal is high and the C output signal is low.

Figure 20:
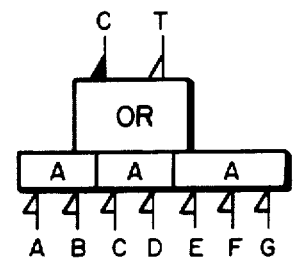
FIG. 20 is the logic block diagram symbol for a combined OR and AND circuit.
Figure 12A:
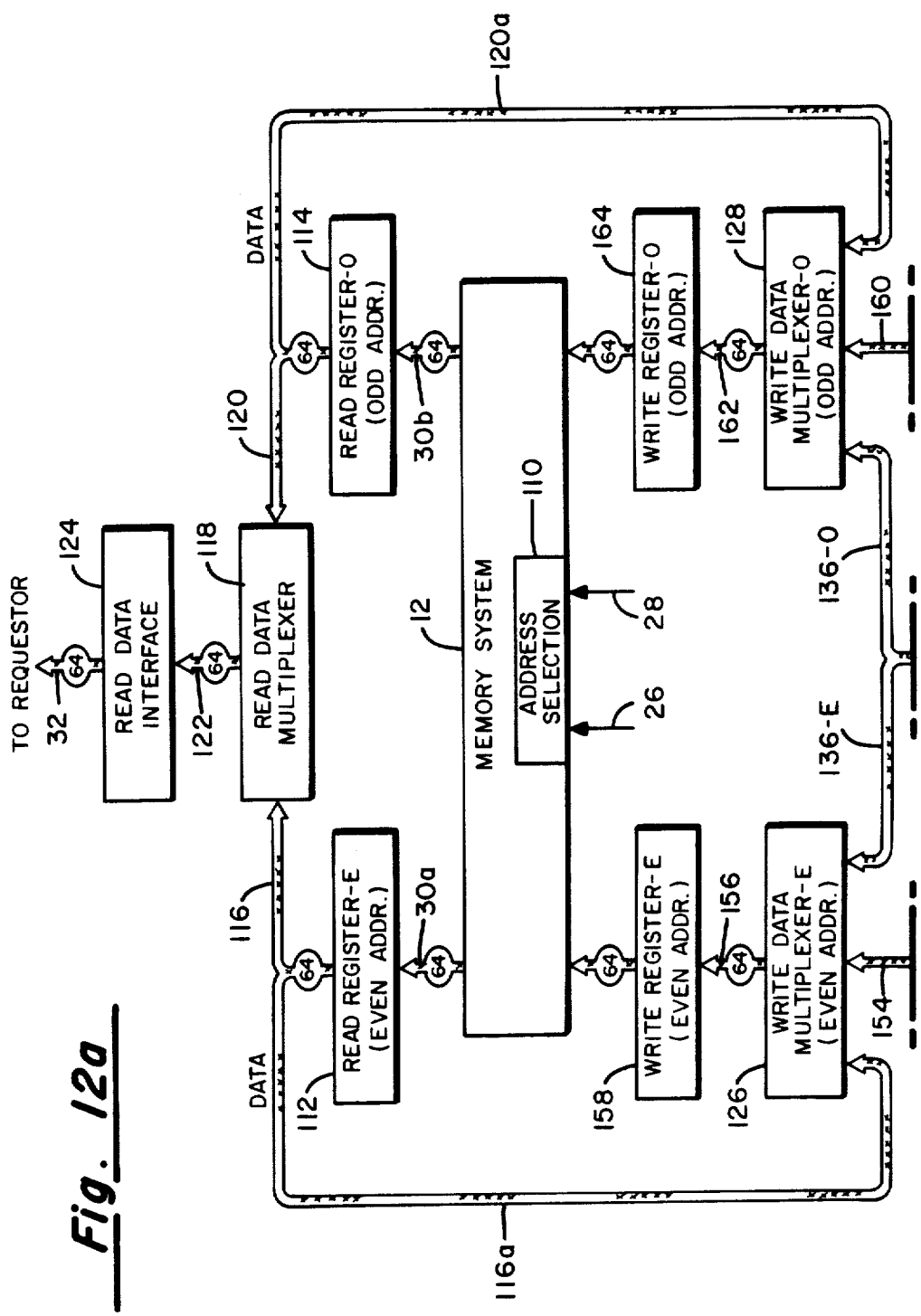
Figure 12B:
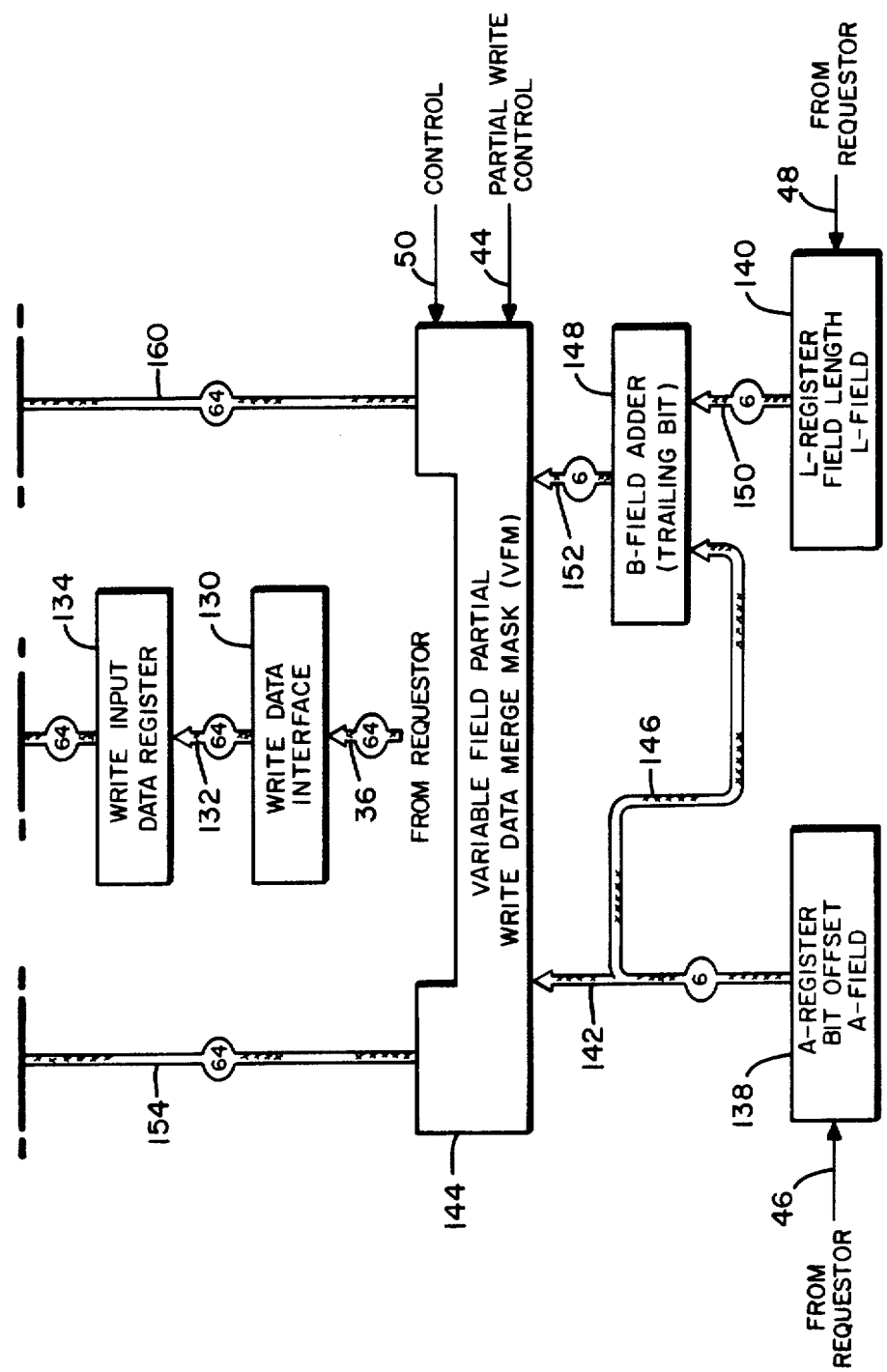

FIG. 20 is a logic block diagram symbol for a combined OR and AND circuit. In this configuration, each of the AND circuits at the input is coupled to one of the OR input terminals, but the connection is not illustrated.

The left-most AND circuit receives input signals A and B, the center AND circuit receives input signals C and D, and the right-most AND circuit receives signals E, F, and G. Each of the AND circuits is a Low AND circuit of the type previously described, and requires low input signals on all of the respectively associated input terminals in order to provide a low output signal to the OR circuit. In operation, then, this circuit will provide a low signal at the T output terminal when any or all of the AND circuits are satisfied. Conversely, a high input signal to any line of any AND circuit will disable that AND circuit, and when all AND circuits are thus disabled, the OR circuit will provide a high output signal on the T output terminal and a low output signal on the C output terminal.

From the foregoing discussions, then, it can be seen that the output terminal flag representation is indicative of the anticipated true input signal combinations for the element. These open and closed flag representations are intended as an aid in the understanding of the detailed logic, and are not intended as a limitation on the invention or the type of circuitry that can be utilized for the embodiment of the invention.

With the foregoing description of the logic elements utilized in the implementation, when taken in view of the description of the general systems operation, those skilled in the art will be readily able to trace through various combinations of events in the detailed logic that will be described. Not every possible combination will be described in detail, since it is felt that this will not add appreciably to an understanding of the invention.

Figure 21:
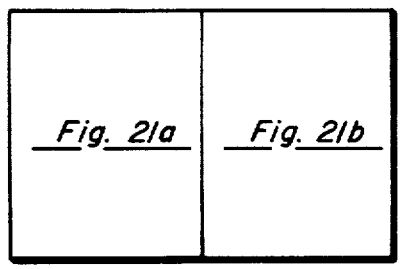
FIG. 21a and FIG. 21b, when arranged as in FIG. 21, is a detailed logic block diagram of the Single Byte Partial Write Detector and Word Select circuitry.
Figure 21A:
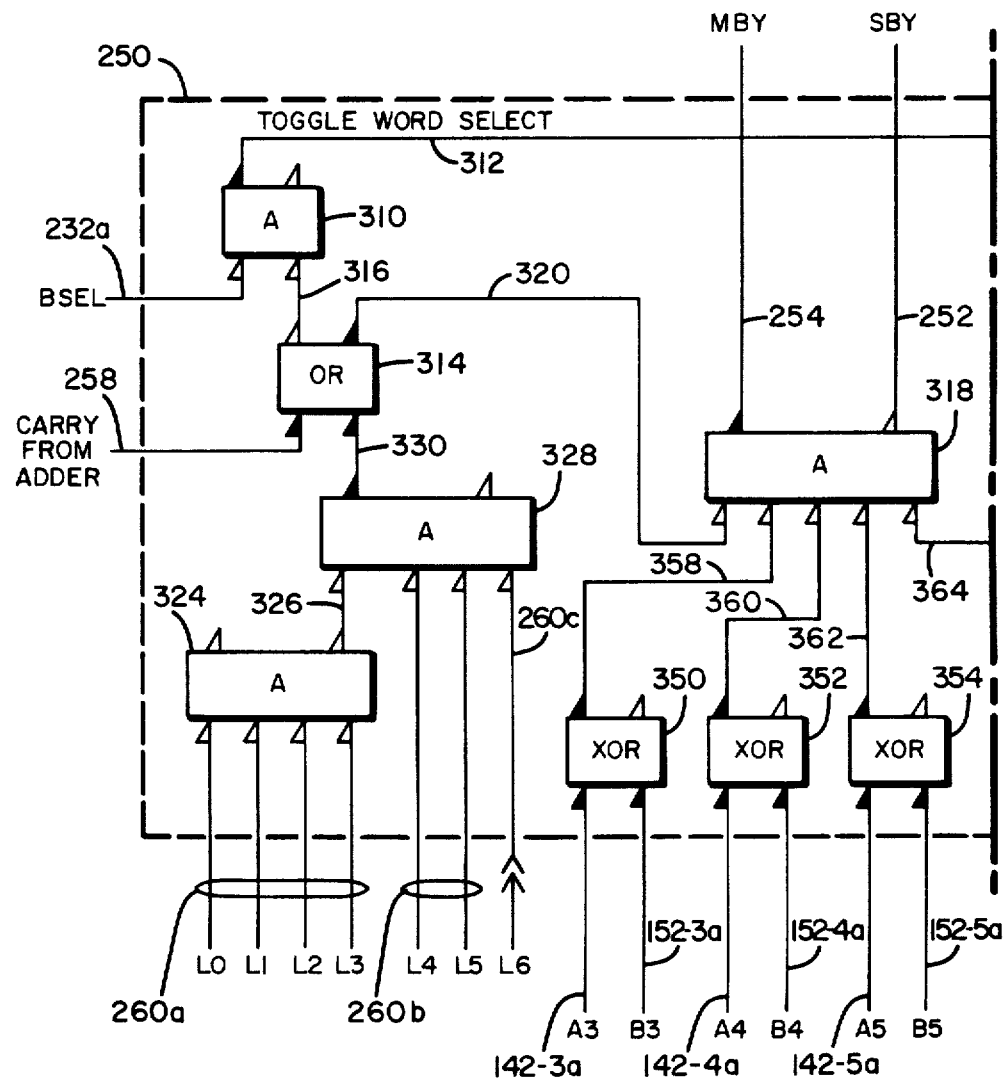
Figure 21B:
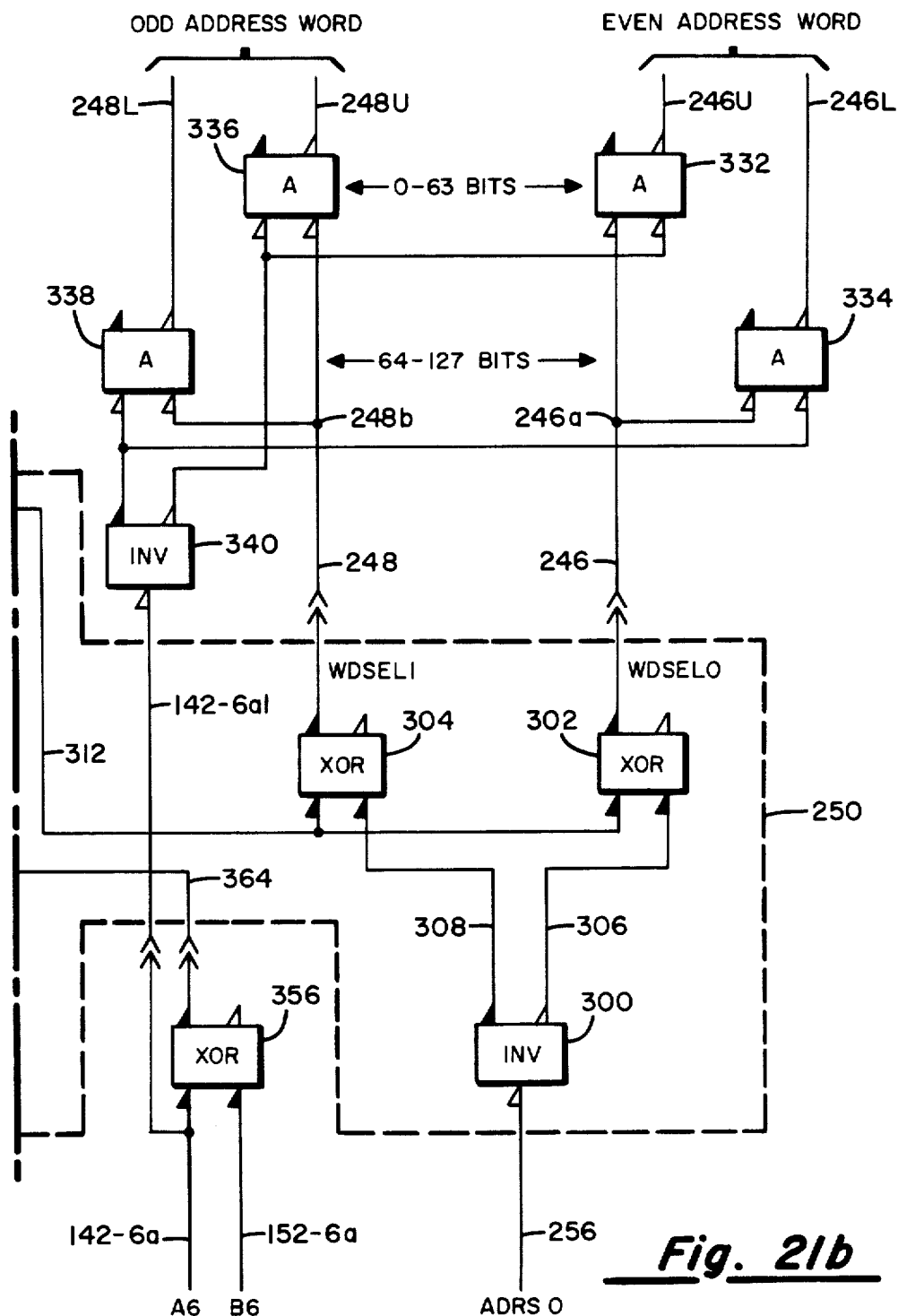

FIG. 21a and FIG. 21b, when arranged as in FIG. 21, is a detailed logic block diagram of the Single Byte Partial Write Detector and Word Select circuitry, and is shown enclosed within dashed block 250. The word selection is initially determined by the least significant bit position of the address, which is received on line 256 by Inverter 300. A pair of XOR circuits 302 and 304 provide the selection signals for the Word 0 and Word 1. The true output terminal of Inverter 300 is coupled by line 306 to one of the input terminals of XOR circuit 302, and the complement output terminal is coupled by line 308 to XOR circuit 304. When the least significant address bit is 0, thereby indicating the selection of Word 0, a low signal is applied on line 256 which results in a low signal being applied on line 306 and a high signal on line 308. During the A portion of the cycle, the B Select signal on line 232a will be absent, thereby providing a high signal to AND circuit 310. This high signal will result in a low output signal on line 312 which is applied to XOR circuits 302 and 304. In this configuration, then, it can be seen that XOR circuit 302 has low input signals applied to both input terminals resulting in the exclusive OR function not being made with a high signal at its true output terminal and a low signal generated on line 246 thereby providing the enable condition for Word Select 0. The combination of low and high signal on the input terminals of XOR 304 satisfies the exclusive OR condition, and it provides a low signal at its true output terminal and a high signal on line 248 at its complement output signal, thereby inhibiting the selection of Word 1 by the high signal on the Word Select 1 line. When the B Select signal is applied on line 232a during the B portion of the cycle, and presuming the other input terminal to AND circuit 310 is receiving a low signal, AND 310 will be switched and will provide a high output signal on line 312. This high signal is applied to XOR circuits 302 and 304, and results in the reversal of a polarity on output lines 246 and 248 thereby effectively toggling the word selection lins. If the least significant bit position of the address is initially a binary 1, thereby indicating the selection of the Odd Address Word, the signals levels on lines 306 and 308 will be reversed, and for the same basic input conditions, the low signal will be generated on Word Select 1 output terminal 248 and the high signal will be generated on Word Select 0 output select line 246.

The further effect of toggling the word selection involves the determination of existence of a Carry signal out of the Adder, as applied on line 258 to OR circuit 314. When a Carry signal is present, there will be a high signal on line 258 which will cause OR circuit 314 to provide a low signal on line 316 to AND circuit 310. Thus, when the B Select signal is present on line 232a, AND circuit 310 will provide a high signal on line 312 thereby toggling the word selection as previously described. The true output terminal of OR circuit 314 is utilized in the determination of Single Byte Write or Multiple Byte Write by AND circuit 318, by the application of a true output signal on line 320 thereto. When the Carry signal is present, OR circuit 314 will be providing a high output signal on line 320 which will effectively block AND circuit 318, and will result in a low output signal on line 254 indicative of the Multiple Byte Write condition. This also results in the output signal SBY on line 252 being disabled.

As previously described, if the L-Field is totally 0, it indicates that there is a full 64-bit word to be written, and when there is any Bit Offset will result in the necessary toggling of the word selection. It is understood that if there is a full word write without Bit Offset, this circuitry is activated such that there is a normal memory writing operation on a word-for-word basis at the address specified. When a Bit Offset is specified and there is to be a full 64-bit word, position L0 through L3 are provided on line 260a as input signals to AND circuit 324, and when all are in the binary 0 state will provide a low signal on line 326 as one of the input signals to AND circuit 328. Positions L4 and L5 of the L-Field provided on line 206b as input signals to AND circuit 328. When all are indicating a binary 0, a high signal will be provided on line 330 as an input signal to OR circuit 314. Therefore, it will be determined that a low signal will be provided on line 316 causing AND circuit 310 to toggle the selection on line 312, while at the same time providing a high signal on line 320 for effectively determining that there is the MBY condition present. From the foregoing detailed description, then, it can be seen that a system for word selection for word boundary crossing has been described for a 64-bit word configuration. In the event that it is desired to expand the system to provide for memory words having capacity up to 128-bits, it is necessary to add the 6-bit position to the A-Field, the L-Field, and the B-Field, as previously described. This expansion would result in the L6 signal being applied on line 260c to AND circuit 328 and the circuit would function as previously described. In the word selection circuitry, the Word Select 0 signal would be applied on line 246a as input signals to AND circuit 332 for selecting the 0 through 63 bit positions of the Even Address Word by the signal on line 246U, and to AND circuit 334 for selecting the bit positions 64 through 127 by the signal on line 246L. Similarly, the Word Select 1 signal applied on line 248 would be directed on line 248b to AND circuit 336 for selecting the bit positions 0 through 63 of the Odd Address Word by the output signals on line 248U, and to AND circuit 338 for selecting the 64 through 127 bit positions by the output signal on line 248L. The A6 signal received on line 142-6a is applied on line 142-6a1 to Inverter 340 which responds thereto in making the word selection.

The selection of SBY condition or the MBY condition is accomplished by XOR circuits 350, 352, and 354, for the 64-bit data word, and with the addition of XOR circuit 356 for expansion to the 128-bit word format. The XOR circuits are adapted to be responsive to like-ordered bit positions of the A-field and the B-Field and each functions to provide a low signal to AND circuit 318 when the associated bit positions are equal. Any comparison of like-ordered bit positions resulting in a difference will result in AND circuit 318 being blocked, and the MBY condition will be selected with a low signal on line 254. In this regard, XOR circuit 350 receives the A3 and the B3 signals on line 142-3a and 152-3a respectively. When both signals are high, or both signals are low, the exclusive OR condition is not satisfied and the output signal on line 358 will be low. When the signals differ, the XOR circuit will provide a high signal on line 358 thereby indicating the MBY condition. In a similar manner XOR circuit 352 evaluates the A4 and B4 bits received on line 142-4a and 152-4a, respectively, and provides the output signal on line 360. XOR circuit 354 evaluates the A5 and B5 bit positions received on lines 142-5a and 152-5a respectively, and provides its output signal on line 362. For the 128-bit position data word alternative, XOR 356 will evaluate the A6 and B6 signals received on lines 142-6a and 152-6a, respectively, and provide its output signals on line 364. When all of the XOR circuits 350, 352, 354, and 356 if used, provide low output signals indicative of equality of like-ordered bit positions, AND circuits 318 will be satisfied and the SBY condition will be selected, thereby indicating that all of the writing occurs within a single byte.

Figure 22B:
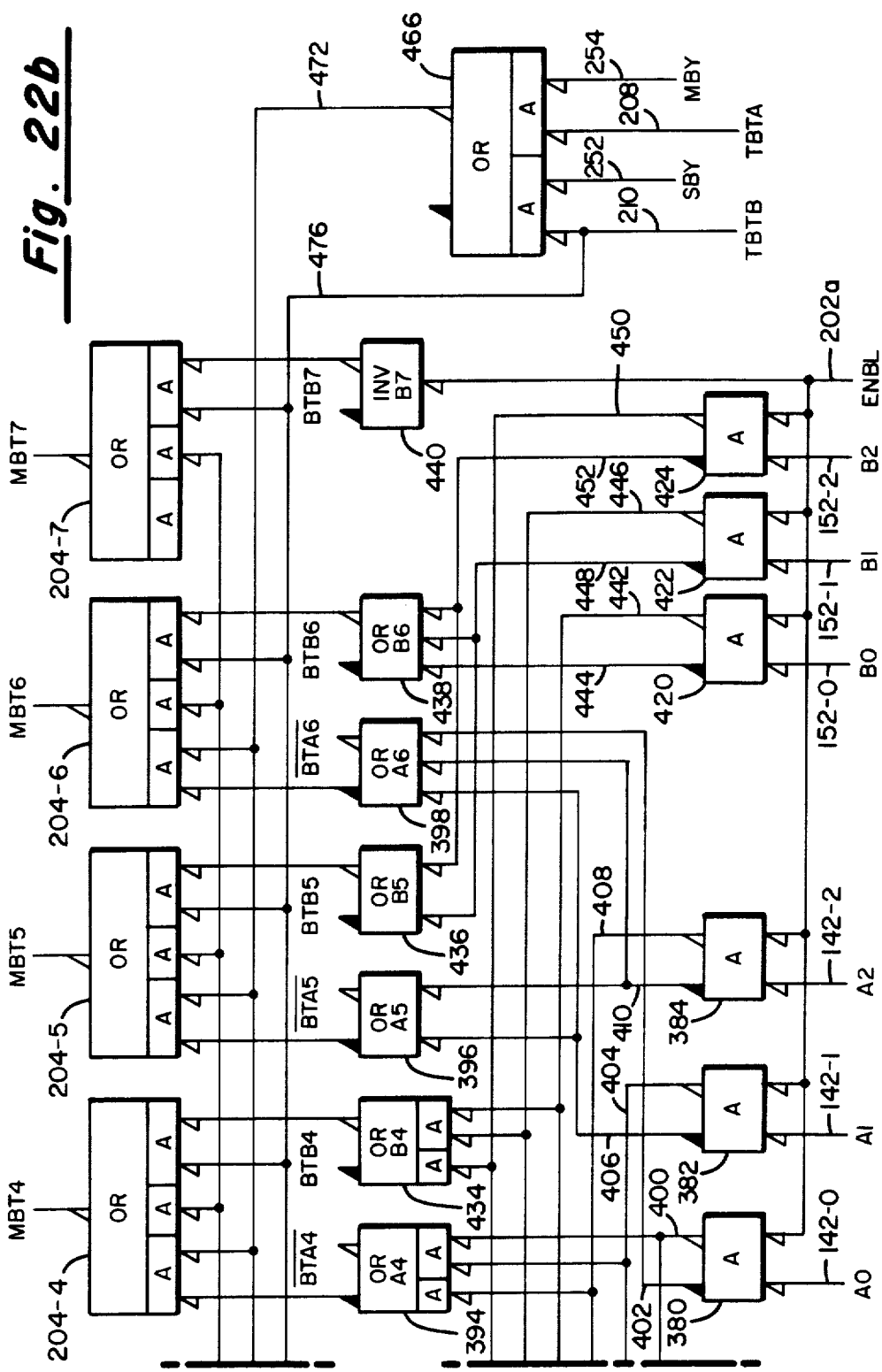

FIG. 22a and FIG. 22b, when arranged as shown in FIG. 22, comprise the detailed logic arrangement for the Starting Bit Decoder/Translator 200, the Trailing Bit Decoder/Translator 206, and the Bit Mask circuitry 204.

The Bit Offset is decoded by AND circuits 380, 382, and 384. AND 380 receives A0 input signal on line 142-0, AND 382 receives the A1 input signal on line 142-1, and AND circuit 384 receives A2 on line 142-2. The true and complement output terminals from these decoder AND circuits are utilized as input signals to the Translator portion of the circuit, which is comprised of AND circuit A0 labeled 386, AND circuit A1 labeled 388, AND/OR circuit A2 labeled 390, INVERTER A3 labeled 392, AND/OR circuit A4 labeled 394, OR circuit A5 labeled 396, and OR circuit A6 labeled 398. The true output terminal of AND 380 is coupled by line 400 as one of the input signals to AND A0 386, to AND/OR A2 390, and to AND/OR A4 394. The complement output terminal of AND 380 is coupled through line 402 to OR A6 398. The true output terminal of AND 382 is coupled by line 404 as an input to AND A0 386, to AND A1 388, to AND/ORs A2 390, and A4 394. The complement output terminal of AND 382 is coupled through line 406 as an input to OR A5 396 and OR A6 398. The true output terminal of AND 384 is coupled through line 408 to AND A0 386, AND A1 388, AND/OR A2 390, INVERTER A3 392, and to AND/OR A4 394. The complementary output of AND 384 is coupled through line 410 as an input to OR A5

396 and to OR A6 398. The Enable signal is applied on line 202a as an enabling input to the decoder AND circuits 380, 382, and 384.

For purposes of example, one sample Bit Offset will be applied to the circuitry. Assuming a Bit Offset of six, which is a binary 110, it will be seen that A0 will be low, A1 will be high, and A2 will be high. Since a Leading Bit is being decoded, the results of the translation should result in positions 6 and 7 indicating the write condition, and positions 0 through 5 indicating the mask condition. If the Leading Bit occurs within the byte, the 7-bit position must necessarily be written and will be forced to the write condition without decoding or translation. Considering the 6-bit position pursuant to the control of OR A6 398, it will be seen that the signal on line 402 will be high, the signal received on line 410 will be low, and the signal received on line 406 will be low. This circuit operates such that a high signal on any input terminal will result in a high signal on the complement output and will be indicative that the writing condition exists, hence the signal designation BTA6. Next considering the 5-bit position, as controlled by OR A5 396, it will be seen that the signal provided on line 410 is low and the signal provided on line 406 is low thereby providing a low signal $\overline{BTA5}$, and will be indicative that a mask condition exists. The 4-bit position is under control of AND/OR A4 394, which for this example will receive a low signal on line 400, a high signal on line 404, and a high signal on line 408. It will be seen that neither of these input AND circuits is satisfied, resulting in a low $\overline{BTA4}$ signal resulting in the 4-bit position being masked. The 3-bit position will be determined by INVERTER A3 392, which receives a high signal on line 408 resulting in a low output signal $\overline{BTA3}$. The 2-bit position is determined by AND/OR A2 390 which receives a high signal on line 404, a high signal on line 408, and a low signal on line 400. Neither of the input AND circuits is satisfied, resulting in a low output signal $\overline{BTA2}$. The 1-bit position is controlled by AND A1 388, which receives a high signal on line 404 and a high signal on line 408, resulting in a low output signal $\overline{BTA1}$. The 0-bit position is determined by AND A0 386, which receives a high input signal on line 408, a high input signal on line 404, and a low input signal on line 400, resulting in a low output signal $\overline{BTA0}$. For this example, then, it can be seen that bit position 7 will be forced to the write condition, the 6-bit position has generated a high signal indicative of the write condition, and bit positions 0 through 5 provide the low output signals indicative of the mask condition. Not every combination of Bit Offset will be described, since those skilled in the art can apply the various signal combinations to the illustrated circuitry to achieve the desired results.

The Trailing Bit Decoder/Translator 26 described in block diagram form in FIG. 14, is comprised of the decoder AND circuit 420, 422, and 424, which receive B0 on line 152-0, B1 on line 152-1, and B2 on line 152-2 respectively; nd the translator circuits comprising AND B0 426, AND B1 428, AND/OR B2 430, INVERTER B3 432, AND/OR B4 434, OR B5 436, OR B6 438, and INVERTER B7 440. The Enable signal is applied on line 202a to all of the decoder AND circuits 420, 422, and 424 and directly to the INVERTER B7 440 resulting in the low output signal BTB7. The true output signal from AND 420 is applied on line 442 to AND B0 426, AND/OR B2 430, and AND/OR B4 434. The complementary output signal is applied on line 444 to OR B6 438. The true output signal from AND 422 is applied on line 446 as an input to AND B0 426, AND B1 428, AND/OR B2 430, AND/OR B4 434. The complementary output signal is applied on line 448 to OR B5 436 and OR B6 438. The true output signals from AND circuit 424 is applied on line 450 as an input signal to AND B0 426, AND B1 428, AND/OR B2 430, INVERTER B3 432, and AND/OR B4 434. The complementary output signal is applied on line 452 as an input to OR B5 436 and OR B6 438.

Applying the example of the Trailing Bit described in combination with FIG. 9, with the Trailing Bit occurring in the 1-bit position, there whould occur high signals for the 0-bit and the 1-bit positions indicating writing of these two bits, with low signals for bit positions 2 through 7 indicating the mask condition. The result of adding the A-Field and the L-Field results in the generation of the Trailing Bit +1 in the B-Field. This will result in the binary 010 being applied as B0, B1, and B2 respectively. Considering the bit positions in order, it will be seen that the high signal on line 446 will cause AND B0 426 to provide a high output signal BTB0 and AND circuit B1 428 to provide a high output signal BTB1, for the 0-bit and 1-bit positions respectively. For the 2-bit position, the low signal applied on line 450 and the low signal applied on line 442 will result in AND/OR B2 430 providing the low output signal BTB2. The low signal applied on line 450 to INVERTER B3 432 will result in the low output signal BTB3. Similarly, the low signal applied on line 450 to AND/OR B4 434 will cause it to provide the low output signal BTB4. For the 5-bit position, the high signal applied on line 452 to OR B5 will result in it providing the low output signal BTB5. Similarly, the high signal applied on line 452 to the OR B6 438 will result in it providing the low output signal BTB6. As previously mentioned, the Enable signal causes INVERTER B7 440 to provide the low output signal BTB7. Further examples of the functioning of the circuitry can be readily traced through by those skilled in the art, and all possible combinations will not be described in detail.

From the description thus far provided, it can be seen that the decoding and translation of the leading Bit and Trailing Bit +1 are available substantially simultaneously. The actual generation of the bit mask configuration will be under control of the timing and control pulses previously mentioned.

The Bit Mask circuitry 204 described in block form in FIG. 14 is comprised of AND/OR circuits 204-0, 204-1, 204-2, 204-3, 204-4, 204-5, 204-6, and 204-7. Each of these bit mask circuits is adapted with three input AND circuits, with the left-most AND circuit utilized to generate the Leading Bit mask configuration, the center AND circuit utilized to generate the 8-bit Read Byte mask condition, and the right-most AND circuit utilized to generate the Trailing Bit mask configuration. These circuit arrangements are identical with the exception of the 7-bit position which does not utilize any input signals for the left-most AND circuit. This absence of a signal results in the output signal MBT7 being forced to the high output condition indicating the write condition during the evaluation of the Leading Bit as previously described, each of the output lines MBT0 through MBT7 are utilized to drive like-ordered bit positions of all of the 8-bit latches, the latches selected for operation being dependent upon the byte masks.

The generation of the bit masks occurs for both partial word write and full word write. When the Bit Offset is zero and a full word is specified in the L-Field, the addressed word will be written, and the entire address +1 word will be masked. The partial word write bit mask generation occurs in two steps if the field to be written does not all occur in a single byte. For the field to be written in a single byte, the timing and control is such that the bit mask is generated during the B phase, as will be described in more detail below.

It will be recalled from the previous discussion that the SBY signal will be low only when A3 and B3 are identical, and A4 and B4 are identical, and A5 and B5 are identical. If there is difference in any bit position, the field to be written extends beyond a single byte. Then the SBY signal will not occur and the MBY signal will be generated for conrol. The timing controls are provided by AND/OR 466 which controls the timing during the A portion of the cycle, line 476 which controls the timing during the B phase of the cycle, and line 212 which controls the A or B timing for the generation of masks for the Read Bytes. When the MBY signal on line 254 is low, and the TBTA signal on line 208 is low, the output from circuit 466 on line 472 will be low, thereby enabling all of the left-most AND circuits of the Bit mask circuit 204-0 through 204-6, thereby allowing the generation of the output signals MBT0 through MBT7 in response to the applied input signals A0, A1, and A2. In the event that the MBY signal is high, thereby indicating that it is not a multiple byte write operation, there will be deactivation of the associated AND circuit, and the Bit Mask circuits will be inoperative during the A portion of the timing cycle. This is necessary since the Leading Bit and Trailing Bit will be in the same byte, such that the mask must be generated simultaneously for the Leading and Trailing Bits, if any. The occurrence of the TBTAB signal on line 212 during the A portion of the cycle, will cause an enabling signal to all of the center AND input terminals of the Bit Mask circuits and will generate the 8-bit masks for the Leading Read Bytes. Similarly, the occurrence of the TBTAB signal during the B portion of the cycle will result in the generation of the 8-bit mask signals for the Trailing Read Bytes. The occurrence of the TBTB signal on line 210 will cause an enabling signal on line 476 to all of the right-most AND input circuits of the Bit Mask circuits thereby enabling the transfer of the translated Trailing Bit +1 mask conditions thereto. In the event it has been determined that it is a single byte write condition, the SBY signal will be present on line 252 as an input to circuit 466. During the TBTB time, circuit 466 will be enabled and will be providing a low signal on line 472, thereby allowing the setting of the mask conditions for the Leading Bits simultaneously with the setting of the Trailing Bit mask conditions enabled by the signal on line 476.

From the foregoing, then, the various mask bit configurations and the timing control for the generation of the Leading Read Data Bytes, the Starting Partial Write Data Byte in which the Starting Bit is located, the Trailing Partial Write Data Byte in which the Trailing Bit is located and the Trailing Read Data Byte have been described in detail. It remains to describe the byte mask generation in detail.

Figure 23:
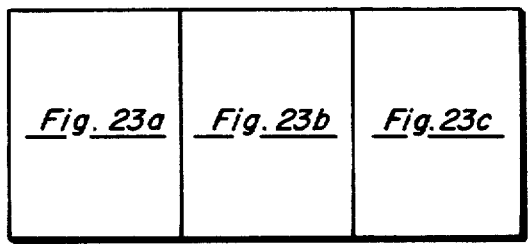
FIG. 23a through FIG. 23c, when arranged as shown in FIG. 23, comprise the detailed logic circuit diagram of the Starting/Trailing Byte Decoder/Translator and the Byte Mask circuitry.
Figure 23A:
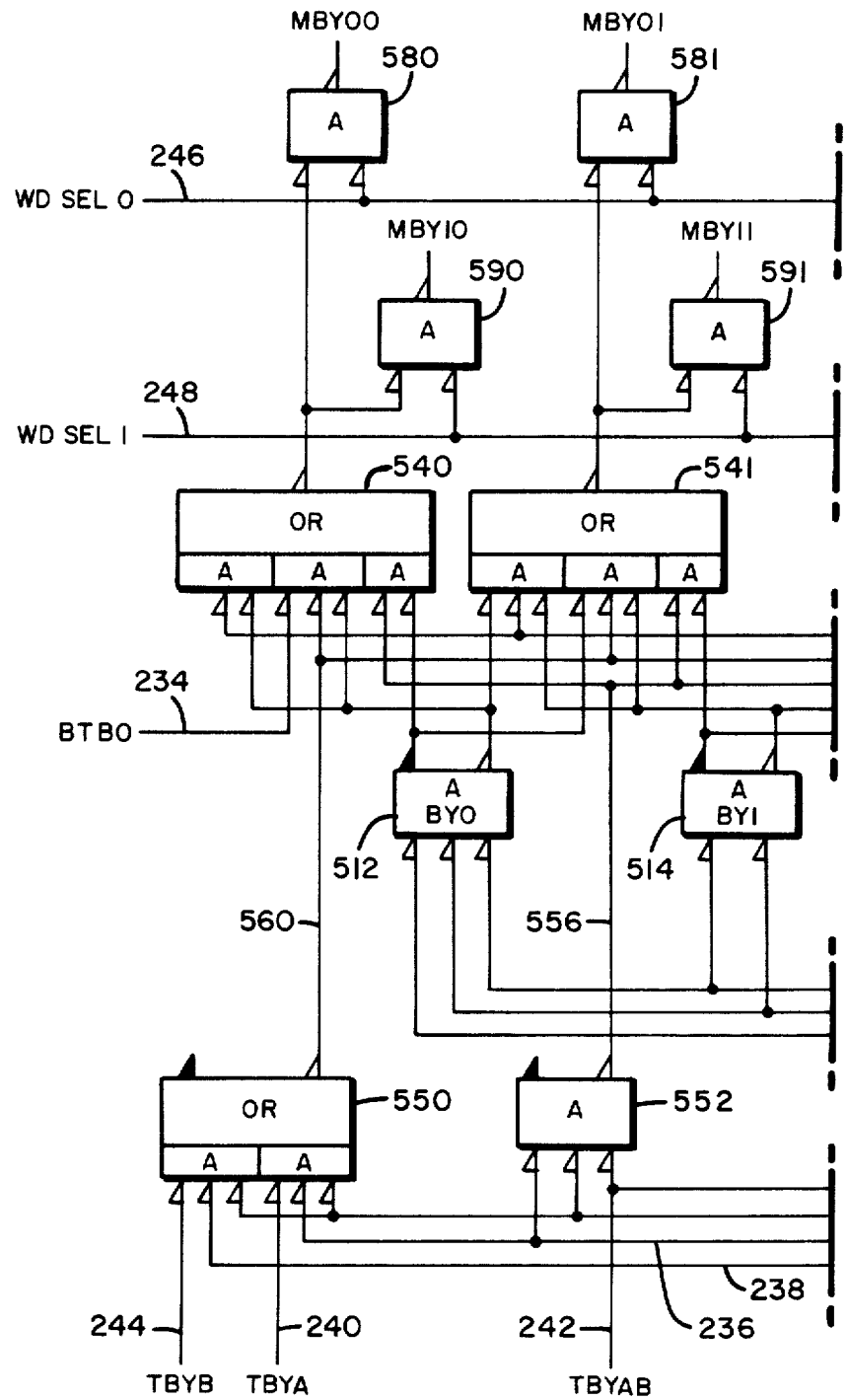
Figure 23B:
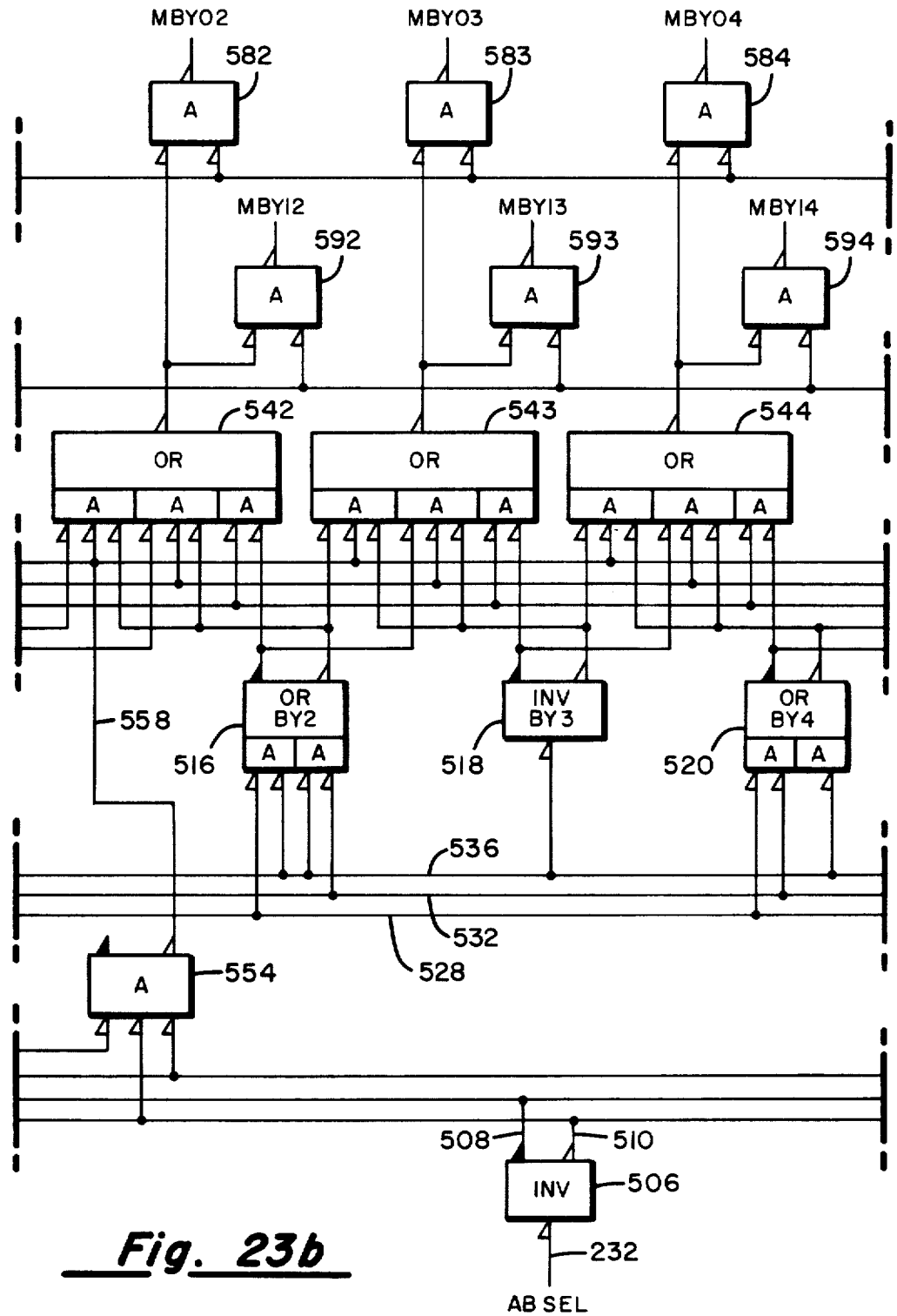
Figure 23C:
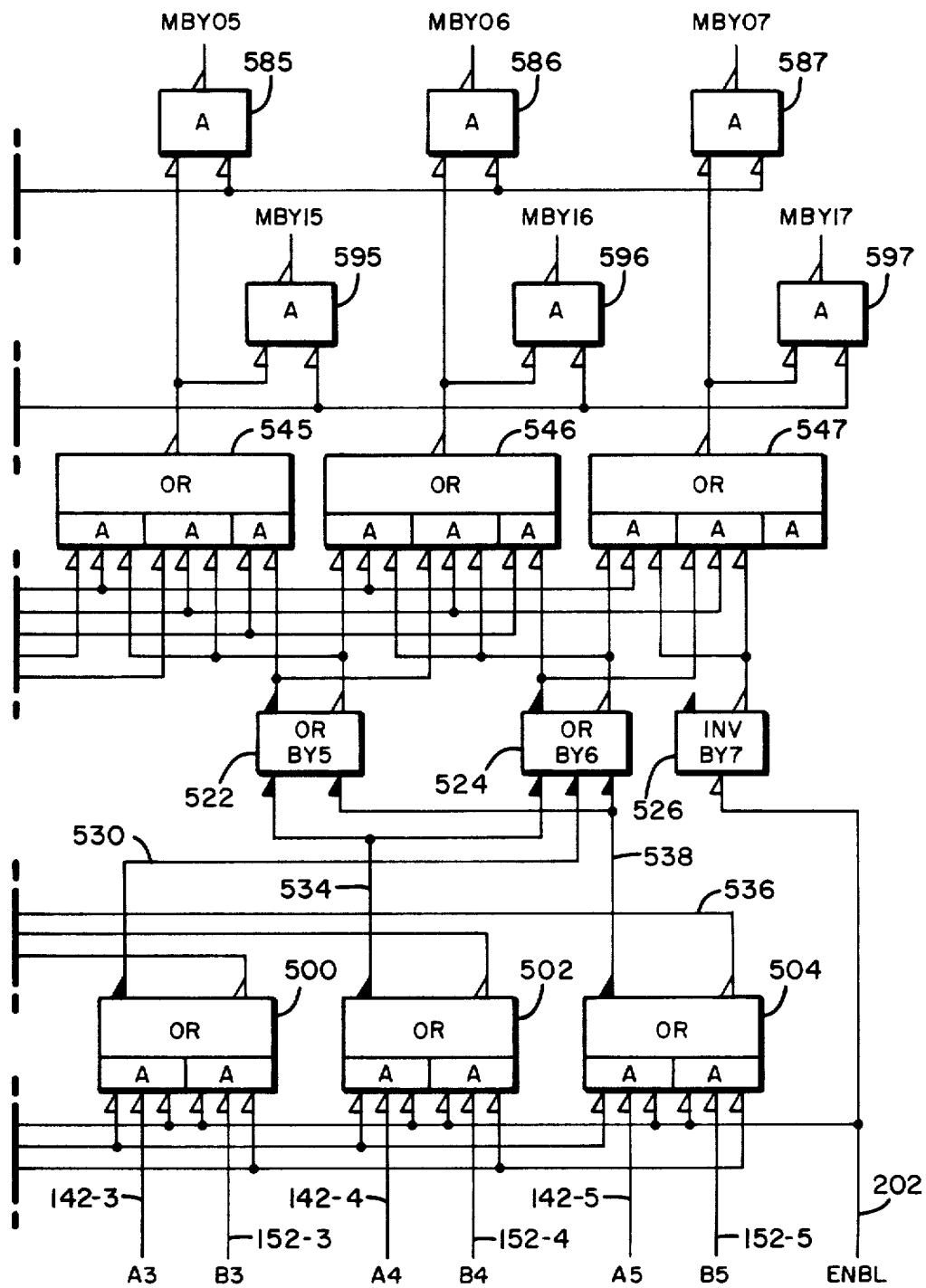

FIG. 23a through FIG. 23c, when arranged as shown in FIG. 23, comprise the detailed logic circuit diagrams of the Starting/Trailing Byte Decoder/Translator 230 and the Byte Mask circuitry 226 described in relation to FIG. 14. The Decoder/Translator portion of the circuitry functions for providing the mask generation control signals for both the leading bits to be masked and the trailing bits to be masked in response to the applied timing and control signals. This functions without duplication of circuitry because the Byte Mask signals are utilized for enabling the 8-bit latch circuit and need not be concerned about the single byte write condition.

The decode portion of the circuitry is comprised of AND/OR circuit 500 which translates the A3 signal received on line 142-3 or the B3 signal received on line 152-3, AND/OR 502 which responds to the A4 signal received on line 142-4 or the B4 signal received on line 152-4, and AND/OR 504 which responds to the A5 signal received on line 142-5 or the B5 signal received on line 152-5. The Enable signal is applied on line 202 as an input to all of these decode circuits and the output signals from INVERTER 506 control whether the Leading Byte Offset is being decoded or whether the Trailing Byte is being decoded. INVERTER 506 receives the AB Select signal on line 232, which will be a high signal during the A portion of the cycle. This will result in the complementary output on line 508 being low and will enable the decoding of the signals A3, A4, and A5. During that time, the signal on line 510 will be high and will disable the decoding of the B-Field. When the AB Select signal switches at the change to the B portion of the cycle, the output signals will reverse, and the low output signal on line 510 will then enable the decoding of the B-field and will inhibit the A-Field.

The translator portion of the circuitry is comprised of the circuits AND BY0 512, AND BY1 514, AND/OR BY2 516, INVERTER BY3 518, AND/OR BY4 520, OR BY5 522, OR BY6 524, and INVERTER BY7 526. The true output of AND/OR 500 is provided on line 528 as an input to AND BY0 512, AND/OR BY2 516, and AND/OR BY4 520. The complementary output is applied on line 530 as one of the input signals to OR BY6 524. The true output signals from AND/OR 502 is provided on line 532 as input signals to AND BY0, AND BY1, AND/OR BY2, and AND/OR BY4. The complementary output is provided on line 534 as an input signal to OR BY5 and OR BY6. The true output signal from AND/OR 504 is provided on line 536 as an input signal to AND BY0, AND BY1, AND/OR BY2, INVERTER BY3, and AND/OR BY4. The complementary output is provided on line 538 as input signals to OR BY5 and OR BY6. INVERTER BY7 526 receives the Enable signal and passes it through the complementary output signals from the translator circuits utilized for the generation of the Leading Byte Masks, and the complementary output signals utilized for the genration of the Trailing Byte Mask.

The Byte Mask generating circuit is comprised of eight AND/OR circuits labeled 540, 541, 542, 543, 544, 545, 546, and 547, each having three AND circuits at the input, except 547 which has two input AND circuits.

The selection of generation of the Leading Byte Mask or the Trailing Byte Mask is under the control of AND-/OR circuit 550, AND circuit 552, and AND circuit 554. The Enable signal is applied to all of these control circuits to enable their activation. AND 552 receives the A Select signal on line 236 and the TBYAB siganl received on line 242. The resultant output control signal on line 556 is directed to the right-most AND circuit of each of the Byte Mask circuits and functions to enable the generation of the Byte Mask positions for the Leading Read Byte. AND 554 receives the B Select signal on line 238 and the TBYAB signal on line 242, with the resultant output signal applied on line 558 to the leftmost AND circuit of the Byte Mask circuitry. AND 554 is enabled during the B portion of the cycle and its output signals functions to enable the generation of the Trailing Read Byte. AND/OR circuit 550 receives the TBYA signal on line 240 which in combination with the A Select signal received on line 236 results in an enable signal on output line 560 that enables the selection of the byte in which the Leading Bit is situated. The signal being directed to the center AND circuit of the Byte Mask circuitry. During the B portion of the cycle, the TBYB signal received on line 244 and the B Select signal received on line 238 result in the enable signal being applied on line 560 that provides for the identification of the byte in which the Trailing Bit is situated.

The complementary output signal from each of the translator circuits is directed to the right-most AND circuit of the associated stage of the Byte Mask circuits and to the center AND circuit of the next higher ordered Byte Mask circuit, with the exception of INVERTER BY7 526 since that is the end-condition. The true output terminal of each of the translator circuits is applied to the left-most AND circuit and the center AND circuit of the associated stage of the Byte Mask circuit and to the left-most AND circuit of the next higher ordered Byte Mask circuit, again with the exception of INVERTER BY7 526 which has no higher ordered related Byte Mask circuit. With the exceptions noted, the arrangement is symmetrical, and it is not deemed necessary to identify each connection other than by reference to the drawings, it being clear to those skilled in the art as to how the circuits interrelate and function. The other end-condition is accommodated by the application of the signal BTB0 on line 234 to the lowest ordered Byte Mask circuit 540.

When the Mask Byte circuitry has been activated as described, the signals are available for enabling the 8-bit latch circuits to be set in response to the various Mask Bit conditions. Since the system provides for a word boundary crossing, as previously described, it is necessary to select which of the two words is presently under consideration. The selection of the output for the even word is accomplished by AND circuits 580, 581, 582, 583, 584, 585, 586, 587, each of said AND circuits being enabled by the Word Select 0 signal received on line 246. In a similar manner, each of the mask byte circuits 540 through 547 have their respective output terminals coupled to a second set of AND circuits 590, 591, 592, 593, 594, 595, 596, and 597. This last set of AND circuits is enabled by the Word Select 1 signal applied on line 248. It can be seen, then, that the initial word selection that was accomplished by the evaluation of the word address results in the selection of the output from the Mask Byte circuits, and that this selection can be altered to the other words by the toggling of the word select lines as previously described.

From the foregoing detailed description of the embodiment of the invention, it can be seen that the various stated purposes and objectives have been satisfied. In order to provide for the expansion of the capacity of the system, for example to a 128-bit word capacity, it would be necessary to add the 6-bit position to the A-Field, L-Field, and the B-Field, as previously described. Assuming that the number of bits within a byte would not be altered, that circuitry would continue as illustrated. It would, however, require that the Byte Mask circuitry be modified to add the additional number of circuits to accommodate the selected word capacity. This would also require the addition of the necessary 8-bit latch circuit. The additional decoding and translation for the extra capacity would follow the same system as described, and would be readily apparent to those skilled in the art. Accordingly, the detailed circuitry for the additional capacity is not shown. Of course if lesser capacity is required, the circuitry can be simplified by elimination of components.

The embodiment shown utilizes the 8-bit latch output circuit for holding the mask configuration. The system could equally work to mix the mask bits with the read data bits during the reading operation, and utilize the resultant bit combination as input signals to the storage device. Having described the embodiment of the invention, what is intended to be protected by Letters Patent is set forth in the appended claims.

What is claimed is:

1. In a memory system having an addressable main memory with reading and writing circuitry for reading and writing an even addressed data word and an odd addressed data word during the same memory reference cycle, wherein each stored data word is comprised of a predetermined number of bits, even address and odd address read registers for storing even and odd addressed data words read from the memory, even address and odd address write registers for storing even and odd addressed data words to be stored in memory, a write register for storing a field of data bits to be written, a variable field writing control system for merging a programmably selected field of data bits within a selected one of the even address or odd address data words, or both, while retaining all bits not within the selected variable bit field unaltered as read from the memory, the variable bit field writing control system comprising:

starting bit receiving means for receiving starting bit offset signals indicative of the selected bit position location of a starting bit in a variable bit field to be written in an addressed memory word;

field length receiving means for receiving field length signals indicative of the number of bit positions in a selected variable field that is to be written;

trailing bit determining means coupled to said starting bit receiving means and said field length receiving means for providing trailing bit signals indicative of the last bit in said selected variable field length bit grouping that is to be written, wherein said trailing bit determining means includes adder means for numerically adding said starting bit offset signals and said field length signals and providing sum signals indicative of the trailing bit plus one position and a carry signal for said selected variable field, carry signal output means for providing said carry signal indicative that a selected variable field will extend beyond the bit position limits of the addressed data word and word boundary crossing to the data word stored in the next sequential address will occur, trailing bit plus one output means coupled to said adder means for providing trailing bit plus one signal indicative of the bit location of the first bit position following said selected variable bit field to be written;

address means for receiving signals indicative of initial selection of an odd or an even address of a memory word to be accessed;

word selection means coupled to said field length receiving means and said carry signal output means and said address means for providing word select signals to said merging means for providing word select signals to said merging means for providing word boundary crossing when a variable bit field to be merged can not be written completely in the addressed data word;

mask bit generating means coupled to said starting bit receiving means and to said trailing bit determining means for providing mask signals for all bit positions that are to be retained and not to be altered in said data words; and merging means coupled to said mask bit generating means for merging data bits to be written with data bits in said memory locations corresponding to said mask signals.

2. In a memory system as in claim 1 wherein each addressable stored data word is comprised of a predetermined number bits arranged in a predetermined number of bytes, wherein said starting bit receiving means includes:

bit offset means for receiving selected first ones of said starting bit offsets signals indicative of the starting bit location in a selected byte of said selected variable bit field to be written; and byte offset means for receiving selected second ones of said starting bit offset signals indicative of the byte location in a selected data word of the byte in which said starting bit is to be written.

3. A variable field writing control system as in claim 2 wherein said mask bit generating means comprises:

leading mask generating means coupled to said starting bit receiving means for generating leading mask signals for all bit positions in said addressed memory word occurring ahead of said starting bit; and trailing mask generating means coupled to said trailing bit determining means for generating trailing mask signals for all bit positions in said addressed memory word occurring after said trailing bit.

4. A variable field writing control system as in claim 3 wherein said leading mask generating means includes leading bit mask generating means coupled to said starting bit receiving means for providing leading bit mask signals for all bit positions preceding starting bit within a starting byte;

leading byte mask generating means coupled to said starting bit receiving means for providing leading byte mask signals for all bytes preceding said starting bit; and leading mask timing receiving means for receiving leading mask timing signals for controlling leading mask bit generation by said leading bit mask generating means and said leading byte mask generating means.

5. A variable field writing control system as in claim 4 wherein said leading bit mask generating means and said leading byte mask generating means includes starting bit decoding and translating means coupled to said starting bit receiving means for providing leading bit mask enabling signals;

bit mask means coupled to said starting bit decoding and translating means and said leading mask timing receiving means for providing said leading bit mask signals;

starting byte decoding and translating means coupled to said starting bit receiving means for providing leading byte mask enabling signals; and byte mask means coupled to said starting bit decoding and translating means and said leading mask timing receiving means for providing said leading byte mask signals.

6. The variable field writing control system as in claim 3 wherein said trailing mask generating means includes trailing bit mask generating means coupled to said trailing bit determining means for providing trailing bit mask signals for all bits following said trailing bit within a trailing byte;

trailing byte mask generating means coupled to said trailing bit determining means for providing trailing byte mask signals for all bytes following said trailing bit; and trailing bit mask timing receiving means for receiving trailing mask timing signals for controlling trailing mask bit generation by said trailing bit mask generating means and said trailing byte mask generating means.

7. A variable field writing control system as in claim 6 wherein said trailing bit mask generating means and said trailing byte mask generating means include trailing bit decoding and translating means coupled to said trailing bit determining means for providing trailing bit mask enabling signals;

bit mask means coupled to said trailing bit decoding and translating means and said trailing mask timing receiving means for providing said trailing bit mask signals;

trailing byte decoding and translating means coupled to said trailing bit determining means for providing trailing byte mask enabling signals; and byte mask means coupled to said trailing bit decoding and translating means and said trailing timing receiving means for providing said trailing byte mask signals.

8. A variable field writing control system as in claim 3 and further including latch means coupled to said leading mask generating means and said trailing mask generating means for receiving and storing said leading bit mask signals and said trailing bit mask signals.

9. A variable field writing control system as in claim 3, and further including:

single byte partial write means coupled to said address means, said carry signal output means, said field length receiving means, said starting bit receiving means, and said trailing byte output means for providing single byte selection signals to said merging means when said starting bit and said trailing bit are located in a single byte.

10. In a memory system having an addressable main memory with reading and writing circuitry for reading and writing an even addressed data word and an odd addressed data word during the same memory reference cycle, wherein each stored data word is comprised of a predetermined number of bits, even address and odd address read registers for storing even and odd addressed data words read from the memory, even address and odd address write registers for storing even and odd addressed data words to be stored in memory, a write register for storing a field of data bits to be written, a variable field writing control system for merging a programmably selected field of data bits within a selected one of the even address or odd address data words, or both, while retaining all bits not within the selected variable bit field unaltered as read from the memory, the variable bit field writing control system comprising:

input means for receiving write field defining signals indicative of the location and number of positions of a selected bit field to be written;

leading bit masking means coupled to said input means for providing masking signals for all leading bit positions that precede said bit field to be written in selected data words;

trailing bit masking means coupled to said input means for providing masking signals for all trailing bit positions that follow said bit field to be written in said selected data word;

variable field write receiving means for receiving write signals indicative of a selected field of data bits to be written;

phase control signal receiving means for receiving phase control signals for enabling said leading bit masking means during a first phase control time and enabling said trailing bit masking means during a second phase control time;

word select receiving means for receiving word select signals indicative of selection of one of two addressed data words that is to be referenced;

leading timing receiving means for receiving leading timing signals for timing said leading bit masking means;

trailing timing receiving means for receiving trailing timing signals for timing said trailing bit masking means;

address means coupled to said word select receiving means for making an initial selection of an odd or an even address of memory words to be accessed;

reading means for reading the addressed data words from the memory system;

merging means coupled to said reading means, said address means, and said variable field write receiving means, said leading bit masking means and said trailing bit masking means for merging said selected field data bits to be written with leading read data bits from said addressed data words as determined by said leading bit masking means and trailing read data bits from said addressed data words as determined by said trailing bit masking means;

word selection means coupled to said input means and to said address means for providing word select signals to said merging means for providing word boundary crossing when a variable bit field to be merged cannot be written completely in the addressed data word; and writing means coupled to said merging means for writing the merged data words in the memory system.

11. In a memory system wherein each addressable stored data word is comprised of a predetermined number of bits arranged in a predetermined number of bytes, having a variable field writing control system as in claim 10 wherein said leading timing receiving means includes:

leading bit timing receiving means for receiving leading bit timing signals for controlling selection of a leading bit and masking of all of bits preceding said leading bit within a leading byte; and leading byte timing receiving means for receiving leading byte timing signals for controlling selection and masking of all bytes preceding said leading bit.

12. A variable field writing control system as in claim 11 wherein said trailing timing receiving means includes trailing bit timing receiving means for receiving trailing bit timing signals for controlling selection of a trailing bit and masking of all bits succeeding said trailing bit within a trailing byte; and trailing byte timing receiving means for receiving trailing byte timing signals for controlling selection and masking of all bytes succeeding said trailing bit.

13. A variable field writing control system as in claim 12 wherein said input means comprises:

leading bit receiving means for receiving leading bit offset signals indicative of the selected bit position location of a leading bit in the variable bit field defined by said write signals and to be written in an addressed memory word;

field length receiving means for receiving field length signals indicative of the number of bit positions in said selected variable field that is to be written;

trailing bit determining means coupled to said leading bit receiving means and said field length receiving means for providing trailing bit signals indicative of the last bit in said variable bit field that is to be written.

14. A variable field writing control system as in claim 13 wherein said trailing bit determining means includes adder means for numerically adding said leading bit offset signals and said field length signals and providing sum signals indicative of the trailing bit plus one position and a carry signal for said selected variable field;

carry signal output means for providing a carry signal indicative that a selected variable field will extend beyond the bit position limitations of the addressed data word and word boundary crossing to another data word will occur;

trailing bit plus one output means coupled to said adder means for providing trailing bit plus one signals indicative of the bit location in a selected byte of the first bit position following said selected variable bit field to be written; and trailing byte output means coupled to said adder means for providing trailing byte signals indicative of the byte location in a selected addressed data word or the alternate selected data work of the byte in which said trailing bit plus one is located.

15. A variable field writing control system as in claim 14 wherein said leading bit receiving means includes bit offset means for receiving selected first ones of said starting bit signals indicative of the leading bit location in a selected byte of said selected variable bit field to be written; and byte offset means for receiving selected second ones of said starting bit signals indicative of the byte location in a selected data word of the byte in which the leading bit is to be written.

16. A variable field writing control system as in claim 15 wherein said leading bit mask means includes leading bit mask generating means coupled to said leading bit receiving means for providing leading bit mask signals for all bit positions preceding said leading bit within a leading byte in response to said leading timing signals; and leading byte mask generating means coupled to said leading bit receiving means for providing leading byte mask signals for all bytes preceding said leading timing signals.

17. A variable field writing control system as in claim 16 wherein said leading bit mask generating means and said leading byte mask generating means includes
- leading bit decoding and translating means coupled to said leading bit receiving means providing leading bit mask enabling signals;
- bit mask means coupled to said leading bit decoding and translating means and said leading bit receiving means for providing said leading bit mask signals under control of said leading bit timing signals;
- starting byte decoding and translating means coupled to said leading bit receiving means for providing leading byte mask enabling signals; and
- byte mask means coupled to said leading bit decoding and translating means and said leading byte timing receiving means for providing said leading byte mask signals under control of said leading byte timing signals.

18. A variable field writing control system as in claim 15 wherein said trailing bit masking means includes
- trailing bit mask generating means coupled to said trailing bit determining means for providing trailing bit mask signals for all bits following said trailing bit within a trailing byte in response to said trailing timing signal; and
- trailing byte mask generating means coupled to said trailing bit determining means for providing trailing byte mask signals for all bytes following said trailing bit in response to said trailing timing signals.

19. A variable field writing control system as in claim 18 wherein said trailing bit mask generating means and said trailing byte mask generating means include
- trailing bit decoding and translating means coupled to said trailing bit determining means for providing trailing bit mask enabling signals;
- bit mask means coupled to said trailing bit decoding and translating means and said trailing bit timing receiving means for providing said trailing bit mask signals under control of said trailing bit timing signals;
- trailing byte decoding and translating means coupled to said trailing bit determining means for providing trailing byte mask enabling signals; and
- byte mask means coupled to said trailing byte decoding and translating means and said trailing byte timing receiving means for providing said trailing byte mask signals under control of said trailing byte timimg signals.

20. A variable field writing control system as in claim 15 and further including
- latch means coupled to said leading bit masking means and said trailing bit masking means for receiving and storing said leading bit mask signals and said trailing bit mask signals.

21. A variable field writing control system as in claim 11, and further including:
- single byte partial write means coupled to said address means, said carry signal output means, said field length receiving means, said leading bit receiving means, and said trailing byte output means for providing single byte selection signals to said leading bit masking means and said trailing bit masking means indicative of that said leading bit and said trailing bit are located in a single byte.

22. In a memory system having an addressable main memory with reading and writing circuitry for reading and writing an even addressed data word and an odd addressed data word during the same memory reference cycle, wherein each stored data word is comprised of a predetermined number of bytes with each byte having a predetermined number of bits, even address and odd address read registers for storing even and odd addressed data words read from the memory, even address and odd address write registers for storing even and odd addressed data words to be stored in memory, a write register for storing a field of data bits to be written, a variable field writing control system for merging a programmably selected field of data bits within a selected one of the even address or odd address data words, or both, while retaining all bits not within the selected variable bit field unaltered as read from the memory, the variable bit field writing control system comprising:
- leading bit receiving means for receiving leading bit signals indicative of the bit position of the leading bit in a variable bit field to be written, said leading bit signals including bit offset signals in a leading byte and byte offset signals in a data word;
- field length receiving means for receiving field length signals indicative of the number of bit positions in the bit field that is to be written;
- adder means coupled to said leading bit receiving means and said field length receiving means for providing trailing bit signals of the bit position location of the trailing bit in said bit field to be written by locating the first bit position not included in said bit field, said trailing bit signals including trailing bit plus one signals in the trailing byte and trailing byte signals in the data word, said adder means including carry output means for providing carry signals;
- leading timing receiving means for receiving leading timing signals for timing generation of leading bit mask signals and leading byte mask signals;
- trailing timing receiving means for receiving trailing timing signals for timing generation of trailing bit mask signals and trailing byte mask signals;
- phase receiving means for receiving first phase control signals for enabling generation of said leading bit mask signals and said leading byte mask signals, and second phase control signals for enabling generation of said trailing bit mask signals and said trailing byte mask signals;
- address select receiving means for receiving address select signals indicative of selection of the odd addressed data word or the even addressed data word;
- leading bit decoder-translator means coupled to said leading bit receiving means and responsive to said bit offset signals to generate leading bit mask enable signals for all bit positions preceding the bit position indicated by said leading bit signals;
- trailing bit decoder-translator means coupled to said adder means and responsive to said trailing bit plus one signals to generate trailing bit mask enable signals for all bit positions following the bit position indicated by said trailing bit signals;
- first and second sets of byte latch means, each set including the number of bytes in an addressable memory word, and each having an enable input means and a predetermined number of latch input terminals matching the number of bits in a byte in an addressable memory word, and a like number of output terminals;

byte decoder-translator means coupled to said phase receiving means, said leading bit receiving means, and said adder means, and responsive to said leading byte offset signals during said first phase to generate leading byte enable signals and responsive to said trailing byte signals during said second phase to generate trailing byte enable signals;

bit mask means having input terminals coupled to said leading bit decoder-translator means and said trailing bit decoder-translator means and said leading timing receiving means and said trailing timing receiving means, and a number of output terminals matching the number of bits in a byte in an addressable memory work, each of said output terminals coupled to all like-ordered ones of said latch input terminals, for generating said leading bit mask signals during first phase and for generating said trailing bit mask signals during second phase;

word select means coupled to said carry output means for providing alternate word selection signals when said variable bit field cannot be completely written in said addressed memory word;

byte mask means having input terminals coupled to said word select means, said byte decoder-translator means, said leading timing receiving means and said trailing timing receiving means, and a number of output terminals matching the number of and coupled to an associated one of the said latch enable input means of said first and second sets of byte latch means, for enabling setting of said leading bit mask signals during said first phase and enabling setting of trailing bit mask signals during said second phase in said first and second sets of byte latch means.

23. A variable field writing control system as in claim 22 and further including single byte partial write means coupled to said leading bit receiving means and said field length receiving means for providing single byte control signals to said bit mask means indicative that said bit field to be written is located totally within a single byte, and multiple byte control signals to said bit mask means indicative that said bit field to be written extends beyond a single byte.

* * * * *

UNITED STATES PATENT AND TRADEMARK OFFICE
CERTIFICATE OF CORRECTION

PATENT NO. : 4,520,439

DATED : May 28, 1985

INVENTOR(S) : Arnolds E. Liepa

It is certified that error appears in the above-identified patent and that said Letters Patent is hereby corrected as shown below:

Column 30, Line 45, "work" should be -- word --.

Column 31, Line 49, "timimg" should be -- timing --.

Column 32, Line 18, "the" 2nd occurrence should be -- a --.

Column 33, Line 15, "work" should be -- word --.

Signed and Sealed this

Seventeenth Day of September 1985

[SEAL]

Attest:

Attesting Officer

DONALD J. QUIGG

Commissioner of Patents and
Trademarks—Designate